US010721312B2

(12) United States Patent
Kelly et al.

(10) Patent No.: US 10,721,312 B2
(45) Date of Patent: Jul. 21, 2020

(54) ORCHESTRATION AND MANAGEMENT OF SERVICES TO DEPLOYED DEVICES

(71) Applicant: Intel Corporation, Santa Clara, CA (US)

(72) Inventors: Mark Kelly, Leixlip (IE); Charlie Sheridan, Ballivor (IE); Jessica C. McCarthy, Dublin (IE); Keith A. Ellis, Carlow (IE); Michael Nolan, Maywooth (IE); Cliodhna Ni Scanaill, Baile Mhuirne (IE); Peter J. Barry, Ardncrusha (IE); Niall Cahill, Galway (IE); Keith Nolan, Westmeath (IE); Hugh Carr, Delgany (IE); Gabriel Mullarkey, Dublin (IE); Brian McCarson, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/114,326

(22) PCT Filed: Feb. 12, 2015

(86) PCT No.: PCT/US2015/015710
§ 371 (c)(1),
(2) Date: Jul. 26, 2016

(87) PCT Pub. No.: WO2015/126734
PCT Pub. Date: Aug. 27, 2015

(65) Prior Publication Data
US 2017/0006116 A1    Jan. 5, 2017

Related U.S. Application Data

(60) Provisional application No. 61/943,449, filed on Feb. 23, 2014.

(51) Int. Cl.
*G06F 15/16* (2006.01)
*H04L 29/08* (2006.01)
(Continued)

(52) U.S. Cl.
CPC .............. *H04L 67/16* (2013.01); *H04L 41/04* (2013.01); *H04L 41/5054* (2013.01); *H04W 4/70* (2018.02)

(58) Field of Classification Search
None
See application file for complete search history.

(56) References Cited

U.S. PATENT DOCUMENTS 8,645,837 B2   2/2014  Little
2007/0118496 A1*  5/2007  Bornhoevd ........... H04L 67/327
(Continued)

FOREIGN PATENT DOCUMENTS

CN  101013957 A   8/2007
CN  101471961 B   11/2012
(Continued)

OTHER PUBLICATIONS

International Preliminary Report on Patentability dated Sep. 1, 2016 for International Application No. PCT/US2015/015710, 13 pages.
(Continued)

*Primary Examiner* — Padma Mundur
(74) *Attorney, Agent, or Firm* — Schwabe, Williamson & Wyatt, P.C.

(57) ABSTRACT

Orchestration and/or management of services on deployed computing, electronic, appliance and like devices are described. A service orchestration and/or management system ("SOMS") may be configured to provide for orchestration and/or management of services to one or more deployed devices. The SOMS may obtain information from deployed devices, such as status, capabilities and service metadata.

(Continued)

The SOMS may then encapsulate and store the obtained information for later use. The SOMS may also store service information, facilitate creation of services based on stored service definition meta-data, modeling or simulating a service prior to deployment, and deployment of a service to remotely deployed devices followed by activation to begin operation of the service. Other embodiments may be described and claimed.

30 Claims, 13 Drawing Sheets

(51) Int. Cl.
 *H04L 12/24* (2006.01)
 *H04W 4/70* (2018.01)

(56) References Cited

U.S. PATENT DOCUMENTS

| | | |
|---|---|---|
| 2007/0233881 A1 | 10/2007 | Nochta et al. |
| 2008/0209033 A1 | 8/2008 | Ginter et al. |
| 2009/0049005 A1* | 2/2009 | Van Wart ............... G06Q 10/06 |
| 2011/0191383 A1 | 8/2011 | Addala et al. |
| 2011/0231846 A1 | 9/2011 | Sabin et al. |
| 2011/0258233 A1* | 10/2011 | Unger ............... G06F 16/24539 |
| | | 707/783 |
| 2012/0254280 A1* | 10/2012 | Parker, II ............... G06F 9/5044 |
| | | 709/201 |

FOREIGN PATENT DOCUMENTS

| | | |
|---|---|---|
| TW | 201332321 A | 8/2013 |
| TW | 201347591 A | 11/2013 |
| WO | WO2013019304 A1 | 7/2013 |

OTHER PUBLICATIONS

International Search Report and Written Opinion dated Apr. 30, 2015 for International Application No. PCT/US2015/015710, 16 pages.

Extended European Search Report dated Aug. 4, 2017 for European Patent Application No. 15752567.6, 8 pages.

Office Action dated Apr. 23, 2019 for European Patent Application No. 15752567.6, 3 pages.

Office Action dated Feb. 14, 2019 for European Patent Application No. 15752567.6, 4 pages.

* cited by examiner

Fig. 8
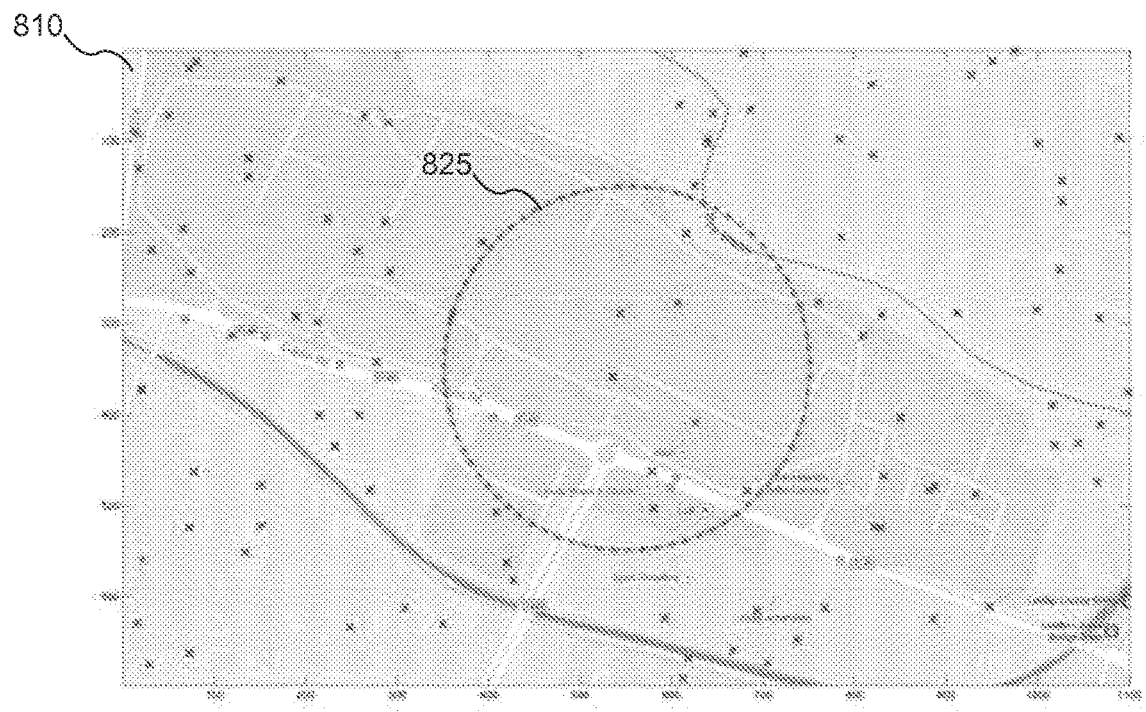
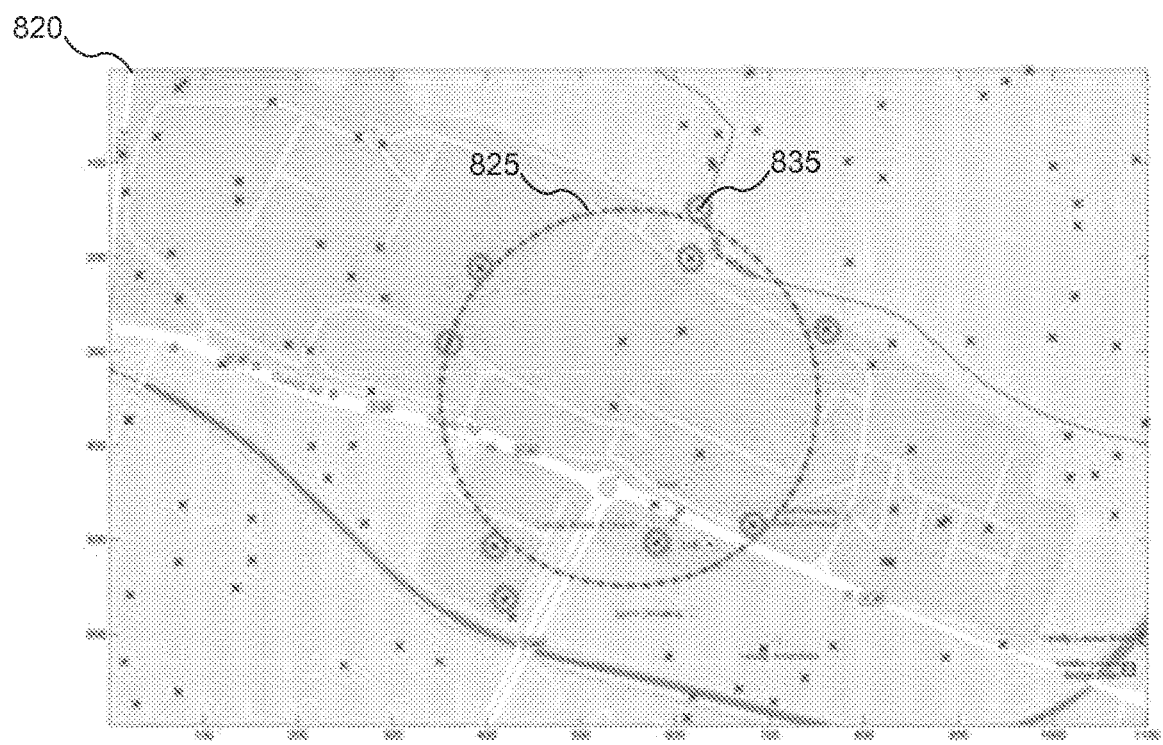

ORCHESTRATION AND MANAGEMENT OF SERVICES TO DEPLOYED DEVICES

CROSS REFERENCE TO RELATED APPLICATIONS

The present application is a national phase entry under 35 U.S.C. § 371 of International Application No. PCT/US2015/015710, filed Feb. 12, 2015, entitled "ORCHESTRATION AND MANAGEMENT OF SERVICES TO DEPLOYED DEVICES", which designated, among the various States, the United States of America, and claims priority to U.S. Provisional Application No. 61/943,449, entitled "A SYSTEM FOR THE ORCHESTRATION OF IOT DEVICES AND SERVICES," filed Feb. 23, 2014. The Specifications of the PCT/US2015/015710 and 61/943,449 Applications are hereby incorporated by reference.

TECHNICAL FIELD

The present disclosure relates to the fields of computing, electronics, appliances and related technology, in particular, to apparatuses, methods and storage medium associated with orchestrating and managing services to deployed computing, electronic, appliance and like devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

The basic premise of the Internet of things ("IoT") is that a variety of objects or things, such as sensors, actuators, location-based systems, and identification technologies such as, but not limited to, radio-frequency identification (RFID), may interact with each other using machine-to-machine communications, and may act in a cooperative fashion to achieve a common goal. An example goal might be a number of air quality sensors gathering information about air quality in a geographically dispersed location. A further example is a series of piezo-electric vibration sensors monitoring equipment performance or monitoring home security. In this regard each sensing device could be considered an IoT device, and the cooperation of many devices working together could be considered an IoT service.

Conventional IoT techniques are sometimes subject to one or more of the following deficiencies:

1. IoT devices are typically single function devices which are programmed for a particular function. Reconfiguration of the device may demand manual intervention and downtime. Thus there may be large barriers for repurposing, and such devices cannot be readily reconfigured to support a different IOT service than that for which they were originally commissioned. Further these single purpose devices may not be configured to run multiple applications preventing participation in multiple IOT services.
2. Inability for devices to self-discover and auto-provision themselves. Typical devices may require end user intervention, and manual configuration with advanced domain and programming knowledge being required. This problem is more pronounced when dealing with large volumes of devices and post-deployment.
3. Inflexible reconfiguration capability: Many IoT compute devices are preconfigured and have little or no capabilities for reconfiguration. This may present significant challenge when devices are in inaccessible locations or are embedded or when devices require direct physical intervention for reconfiguration. Devices may not be able to run multiple computing workloads.
4. There may be significant costs (both operational costs and capital costs) associated with deployment of IOT services.
5. Current IOT offerings may not provide on-demand device and network performance metrics. Such metrics may be needed to provision resource-aware services such as community-grid optimization services.
6. Divergent network topologies may be difficult to interconnect. As an example combination of two network topologies, one that is low latency, high frequency and one that is high latency, bursty data may be difficult.
7. Typical computing workloads may be processed on cloud-centric infrastructures. This may present a number of potential issues such as: (i) excessive latency, which can prohibit (near) real-time services delivery such as home automation and healthcare alerting; (ii) centralized compute processing acting as a single point of failure in the event of loss of WAN connectivity; (iii) prohibitive cost of data transmission for machine-to-machine type data transmission; and (iv) the sending of all data, irrespective of its value, for processing in the cloud.
8. Cloud centric approaches often raise privacy, security and authentication issues. Users may not be afforded the ability to determine which data they wish to share; this may be especially concerning for residential or high-value industrial users.
9. Current offerings may not provide on-demand device and network performance metrics. Such metrics may be needed in the provisioning of resource-aware services such as community-grid optimization services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

FIG. 8 illustrates example selection of deployed devices, in accordance with various embodiments.

DETAILED DESCRIPTION

Figure 1:
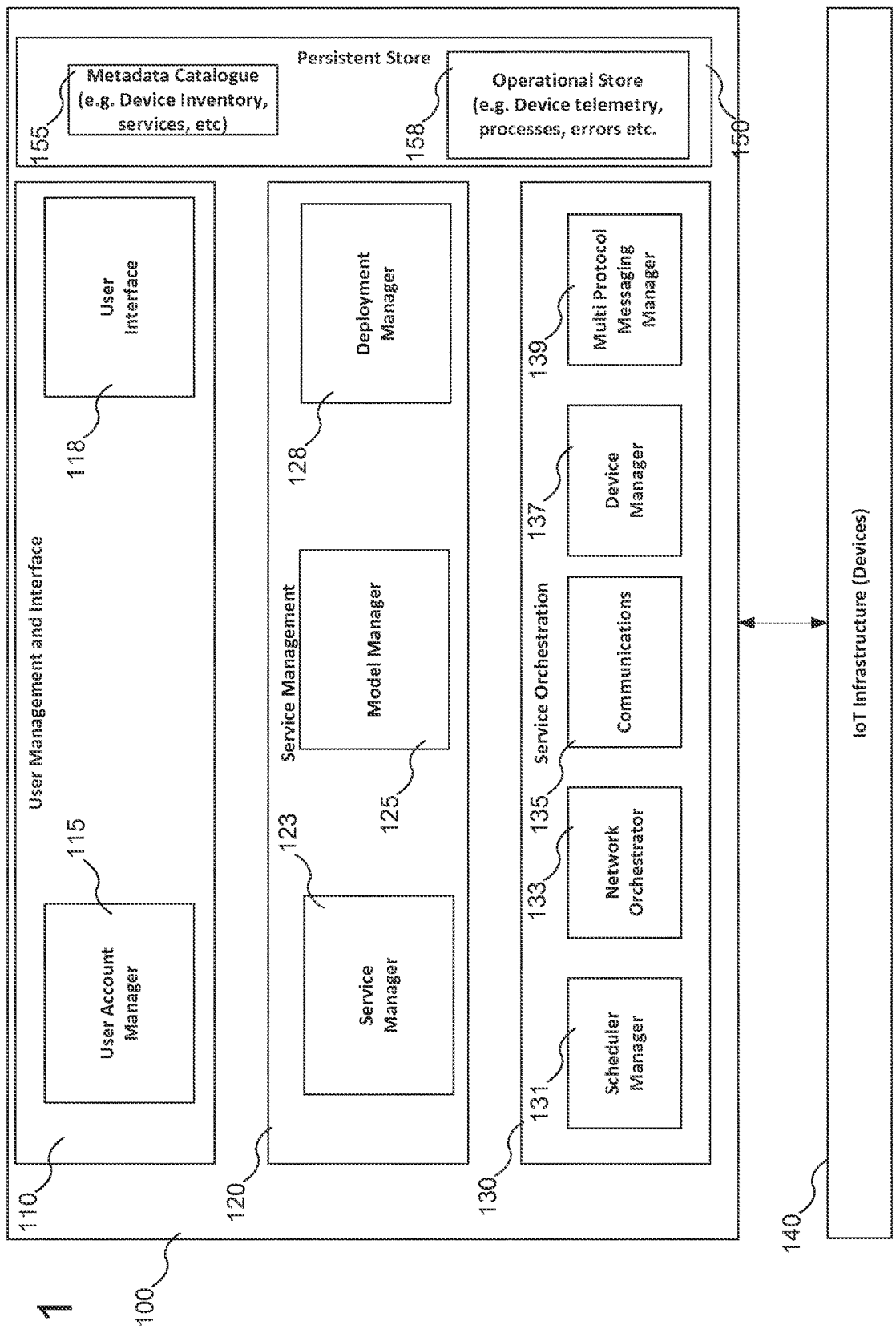
FIG. 1 is a block diagram illustrating components of a service orchestration and/or management system, in accordance with various embodiments.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Methods, computer-readable storage media, and apparatuses for orchestration and/or management of services on deployed devices are described. As described herein, devices, and in particular devices associated with Internet of Things ("IoT") activities, may include various devices capable of performing computing and other functions, such as through the operation of computing processors, capturing and sending data such as observations, acting on received data, and/or communication with other entities such as devices and/or systems; no particular limitation may be implied by the examples of devices provided herein. In various embodiments, one or more devices used with the techniques described herein may include storage. In various embodiments, the devices may be capable of being controlled by other devices and/or systems. These devices may be deployed such that they may be physically placed in a geographical area, workplace environment, aboard a moving vehicle, integrated with appliances or otherwise, such that they may monitor and gather real-world data efficiently. Further, services may include operations of one or more devices working together, such as to monitor an area, gather data, perform a task, or perform other activities.

In embodiments, a service orchestration and/or management system ("SOMS") may be configured to provide for orchestration and/or management of services to one or more deployed IoT devices. The SOMS may be configured to perform such orchestration and/or management in a heterogeneous IoT infrastructure. In various embodiments, the SOMS may facilitate a user in provisioning services by abstracting complexities associated with an IoT infrastructure and reducing the technical domain knowledge and knowhow required of technologies utilized in the devices.

In various embodiments an agent (such as a service orchestration agent) may be installed on a IoT device and may communicate with the SOMS. The agent may send data which may include information such as: telemetry information (which may include information such as device status information and device capabilities), service metadata which may include information such as, but not limited to, sensor information for the devices (e.g., sensor types that devices include or are interfaced with), task information for devices (which may include information such as e.g., tasks running, estimated completion time, capacity for running further tasks, etc.), and service payload data (which may include information such as observations such as metric measurements, sensor measurements, etc.) to the SOMS. The service orchestration agent may also act as a conduit through which data, for example such as service binaries, service metadata, telemetry, control and service payload data may be conveyed between the devices and the SOMS.

Examples of methods or protocols which may be used to convey information between the SOMS 100 and devices include secure copy ("SCP"), file transfer protocol ("FTP"), message queue telemetry transport ("MQTT") and RESTful API approaches for example using HTTP Methods for RESTful Services, e.g. HTTP GET, PUT, POST etc. It will be appreciated by one skilled in the art that these methods or protocols are exemplary only and one will appreciate that these and other proprietary and/or public protocols or methods may be used to convey information for disclosed embodiments.

In addition to the service orchestration agent being responsible for dispatching information such as device telemetry information, service payload, service metadata, and device event information, the service orchestration agent on the device may be configured to receive incoming data and/or instructions from the SOMS (for example from a device manager) and to convert this received information into actions for the device.

In various embodiments, the service orchestration agent on the device may obtain or derive pertinent information that it sends to the SOMS 100. For example the service orchestration agent may send system logs, application logs, network status information etc., to the SOMS. In various embodiments, for example on a device with a Linux OS, the service orchestration agent may also obtain or derive information using Linux methods or commands, for example ifconfig (to provide information on network interfaces), df (to provide information on disk space/usage), du (disk usage), free-m (RAM), vmstat (to obtain virtual memory statistics), etc. It will be appreciated that these are exemplary only and that one skilled in the art will appreciate that these and other commands and/or operating system calls may be used to obtain information. The service orchestration agent may, in various embodiments, be installed on different types of devices with different operating systems and use the appropriate means on a particular device to obtain the information for sending to the SOMS 100. It may be recognized that the terms "agent" and "service orchestration agent" are not meant to imply any particular limitations or capabilities, and in various embodiments the agent could have simpler or more complex processing and/or communication capabilities.

In various embodiments, the SOMS may be configured to obtain information from deployed devices, such as telemetry information describing device status information and device capabilities. The SOMS may also be configured to obtain other information from devices, such as service metadata which may include information such as, but not limited to, sensor information for the devices (e.g., sensor types that devices include or are interfaced with) and task information for devices (e.g., tasks running, estimated completion time, capacity for running further tasks, etc.). The SOMS may incorporate or have access to storage means to store the obtained data such, as a persistent store. In various embodiments, the information obtained from devices may be obtained directly from the devices, such as through device-pushed data or data sent in response to a request. In other embodiments, the information may be stored on the persistent store by the devices and then later obtained by the SOMS from the persistent store. The SOMS may then encapsulate and store the obtained information such as using a service orchestration language object ("SOL") for later use. The SOMS may also be configured to store service information, such as in a meta data repository where multiple versions and configurations of a service can be stored and retrieved. The SOMS may also be configured to obtain data from other sources, for example data arising from user interactions with the system.

In various embodiments, the SOMS may facilitate creation of services. In various embodiments, the SOMS may facilitate creation of a service based on stored service definition metadata. In various embodiments, the SOMS may facilitate modeling or simulating a service prior to deployment of the service based on the resources available to them, such as, for example, numbers of IoT devices available, available network bandwidth, computing resources, budget, cost, etc. The SOMS may also facilitate a user in managing and/or stopping prior-running or deprecated services in order to deploy and reconfigure current services. The SOMS may then allow for deployment of a service to remotely deployed devices followed by activation to begin operation of the service. In various embodiments, the SOMS may facilitate service creation through use of one or more user interfaces and associated API's which may facilitate user control and visualization of the service workflows. Other embodiments are described below.

FIG. 1 is a block diagram illustrating components of a service orchestration and/or management system 100 ("SOMS 100"), in accordance with various embodiments. While particular entitles are illustrated in FIG. 1, it may be recognized that, in various embodiments, the particular modules, storage entities, and user interfaces illustrated in FIG. 1 may be duplicated, renamed, combined with other illustrated entities, divided into additional entities, or omitted. Additionally, while particular sets of entities may be described herein as occurring within various "layers", this terminology should not necessarily be read to imply any particular ordering of operations of the entities described herein nor any particular directionality of information flow. Further, while the entities illustrated in FIG. 1 are all illustrated as being contained as part of a unified SOMS 100 for the sake of easier illustration, it may be recognized that entities performing activities of the SOMS 100 may be located at different devices and/or systems and may communicate in various manners, such as through wired and/or wireless communications.

In various embodiments, the SOMS 100 may perform service management and/or orchestration activities with regard to an IoT infrastructure 140. The IoT infrastructure 140 may include one or more deployed devices, including data generating and collecting devices, as well as processing devices. For example, devices in the IoT infrastructure may include, but are not limited to: devices, actuators, sensors, communication devices, gateways, edge based devices, RFID tags, and mobile devices. In various embodiments, the devices in the IoT infrastructure 140 may have particular capabilities not found in other devices, such as the ability to record images, video, or sound, the ability to store data, or the ability to take particular sensor readings, such as air or water quality or vibration data. In various embodiments, devices in the IoT infrastructure 140 may include storage and/or may be capable of being controlled by other devices and/or systems.

The IoT infrastructure 140 may include a wide variety of deployment scenarios some of which may be deployed outside traditional fixed locations, such as data centers. The IoT infrastructure 140 may be configured such that devices included within the IoT infrastructure 140 may operate in co-operation or may operate in tandem with each other. In various embodiments, the devices of the IoT infrastructure 140 may include aggregators and/or gateways which provide processing and communication capabilities.

In various embodiments, the SOMS 100 may include a user management and interface layer 110 ("UIL 110"), which may facilitate user management as well as user interaction, and presentation of user information, such as toward generation, modification, and deployment of services. In various embodiments, the UIL 110 may include a user account manager 115 ("UAM 115") which may facilitate provisioning and management of users of the SOMS 100. The UMI 110 may also include a user interface 118 ("UI 118"), which may provide for presentation of information and receipt of user interactions. In various embodiments, the UI 118 may be configured to facilitate a user in requesting information about available services and, in response, to present the user with available service information, such as a list of available services from a system service catalogue. In various embodiments, the UI 118 may be configured to receive interactions from a user to facilitate the user in performing tasks such as selecting a service or customizing a service. In various embodiments, the UI 118 may be configured to present service deployment results to users. In various embodiments, the UI 118 may also be configured to solicit feedback from the user, such as upon completion of a service.

In various embodiments, the SOMS 100 may include a persistent store 150 ("PS 150"), which may include one or more storage modules. In various embodiments, the PS 150 may include various attached or remotely connected storage devices or systems, as may be understood. The PS 150 may include a metadata catalog 155 ("MDC 155"), which may be configured to store device inventory data and/or service definitions and other service information. The PS 150 may also include an operational store 158 ("OS 158"), which may be configured to store information such as, but not limited to: device telemetry, service information, processes, error reports, etc. While the PS 150 is illustrated in FIG. 1 as including both the MDC 155 and OS 158, in various embodiments, the PS 150 may store information using different architectures. In various embodiments, the PS 150 may be distributed between multiple systems and/or devices.

In various embodiments, the SOMS 100 may include a service management layer 120 ("SML 120"). The SML 120 may provide interfaces, such as application program interfaces, or "API"s, which may be used by the UI 118 or by an application communicating with the SOMS 100. In various embodiments, these interfaces may include interfaces such as a representational state transfer ("REST") API or a sockets interface, but are not limited to these examples, as may be understood.

In various embodiments, the SML 120 may include a service manager 123 ("SM 123"). The SM 123 may be configured to receive input from a user to map the user's service objectives to a deployable service. The SM 123 may also be configured to facilitate service composition and to monitor service performance as the service is deployed and operating on a particular set of devices. The SM 123 may monitor particular performance indicators and report these back, such as for presentation to a user. The SM 123 may also be configured to monitor associations, including logical associations, between various components of devices that are used to perform the service.

In various embodiments, the SML 120 may also include a model manager 125 ("MM 125"), which may be configured to perform service suitability analysis, as described herein. The MM 125 may be configured to match particular characteristics or requirements for a service with particular infrastructure available to a user (e.g., deployed devices with particular sensors or computational capabilities). The MM 125 may thus be configured to match services and available infrastructure. In various embodiments, the SML 120 may also include a deployment manager 128 ("DM 128") which may be configured to deploying service to available devices.

In various embodiments, the SOMS 100 may include a service orchestration layer 130 ("SOL 130"), which may include one or more modules configured to support operational management of deployed devices. The SOL 130 may include a scheduler manager 131 ("SCM 131") which may be configured to schedule service deployment to deployed devices. In various embodiments, the SCM 131 may be configured with a queuing or on-demand mechanism to schedule service deployment. In various embodiments, the SCM 131 may be configured to schedule state of services and/or completion of services. For example, in a time-bound service, such as measuring air quality during the day, the SCM 131 may be configured to schedule cessation of air quality sensor readings at the end of each day.

In various embodiments, the SOL 130 may also include a network orchestrator 133 ("NO 133") which may be configured to configure, manage, and monitor communications networks which are managed by the SOMS 100. In various embodiments, the NO 133 may be configured to perform dynamic reconfiguration of networks, for example, when new services are deployed. In various embodiments, the SOL 130 may also include a communications module 135 ("CM 135"), which may be configured to monitor and manage communications between devices and the SOMS 100.

The SOL 130 may include a device manager 137 ("DVM 137") which may be configured to manage deployed devices, such as IoT devices. The DVM 137 may be configured to access, collect and/or retrieve data from the PS 150, such as system diagnostic and performance measurements, status, reliability, etc. The DVM 137 may also be configured to derive information from the data it accesses on the PS 150. The DVM 137 may be configured to perform business logic based on data it accesses on or receives from the PS 150, such as by analyzing logs or errors or events that are device or service related. Thus for example the DVM 137 may analyze log files stored on the PS 150 and generate business logic based on, e.g., pertinent errors or events found there. In various embodiments, such business logic could result in, e.g., a control message being originated by the DVM 137 and routed via the multi-protocol messaging manager 139 to result in deactivation and removal from service of a device, such as a device that has been detected as under performing from log or error analysis. Examples of other control messages that could be originated from the device manager may include service-related command messages such as control messages that result in addition of one or more devices to a service device pool and activation of such devices. In another example a control message may result in resizing of device resources that are assigned to a service device pool (for example to allow one or more devices support more than one service). Further examples of control messages originated from the device manager could include actuation messages.

The DVM 137 may also be configured to bring devices online and offline, provide software updates, schedule device reboots, schedule periodic testing of devices, originate control messages that result in device configuration and maintenance being performed, etc. In various embodiments, the examples described above may be triggered and/or originated by the DVM 137 based on analysis of data available on the PS 150 or independently of such analysis. The DMV 137 as well may be configured to provide data updates to the PS 150, such as based on analysis described above. In an alternative embodiments the DVM 137 may also, such as via control messages, request a device to send data such as system diagnostic and performance measurements, status, reliability, etc., to the PS 150 or to the DVM 137, which could in turn send such data to the PS 150. In other alternative embodiments the DVM 137 may collect or receive data (such as system diagnostic and performance measurements, status, reliability, etc.) from devices by other means and update the persistent store 150 with such data. Such data may be received from the devices actively sending data to the DVM 137 or by the devices replying to requests for data from the DVM 137.

In various embodiments a service configuration profile may include one or more configuration items such as sensor duty cycles, which may specify timing and/or regularity of upload of sensor data (e.g., a reporting interval) from a device to the SOMS 100. In various embodiments such a configuration item may be set by a control message originating from the DVM 137 to a device. As illustrated by these examples, configuration items and service configuration profiles may be set by one or more control messages originating from the DVM 137 to a device.

In various embodiments, the SOL 130 may also include a multi protocol messaging manager ("MMM 139") which may be configured to manage messages between devices and the SOMS 100. For example, the MMM 139 may be configured to dispatch control messages to devices as well as to manage data such as telemetry messages, executable files, events, etc., between the devices and the SOMS 100. The MMM 139 may also be configured to manage service payload data such as, for example, metric measurements, sensor measurements, etc. In various embodiments, service payload data may be sent from a device to the MMM 139. In various embodiments, the MMM 139 may be configured to handle messages including, but not limited to, service payload messages, telemetry messages, executable files, actuation messages, service command messages. Messages may include or encapsulate information pertaining to service profile messages (which may include information or messages pertaining to service configuration profiles) and/or network configuration profiles, (which may, include information such as associated configuration items and pertinent executable files), general purpose IO (such as analog pin exported, digital pin exported, etc.), number of context switches per second, and configuration information. In various embodiments, the MMM 139 may send information from devices to the PS 150. In various embodiments, the MMM 139 may be configured to manage messages via REST, message queue telemetry transport ("MQTT"), and/or secure copy protocol ("SCP"), as well as other protocols.

Figure 2:
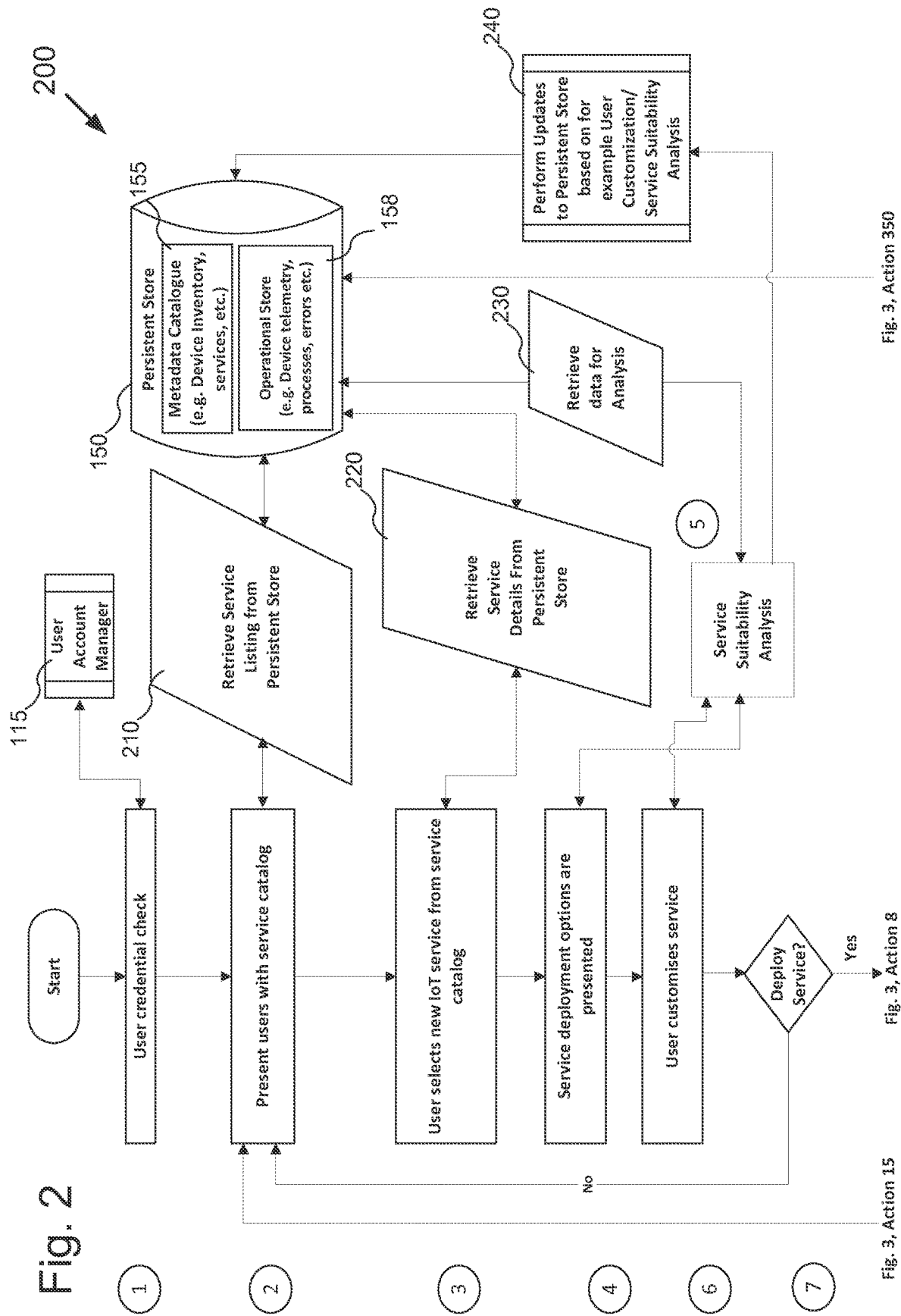
FIG. 2 illustrates an example process for orchestrating and/or managing services to deployed devices, in accordance with various embodiments.
Figure 3:
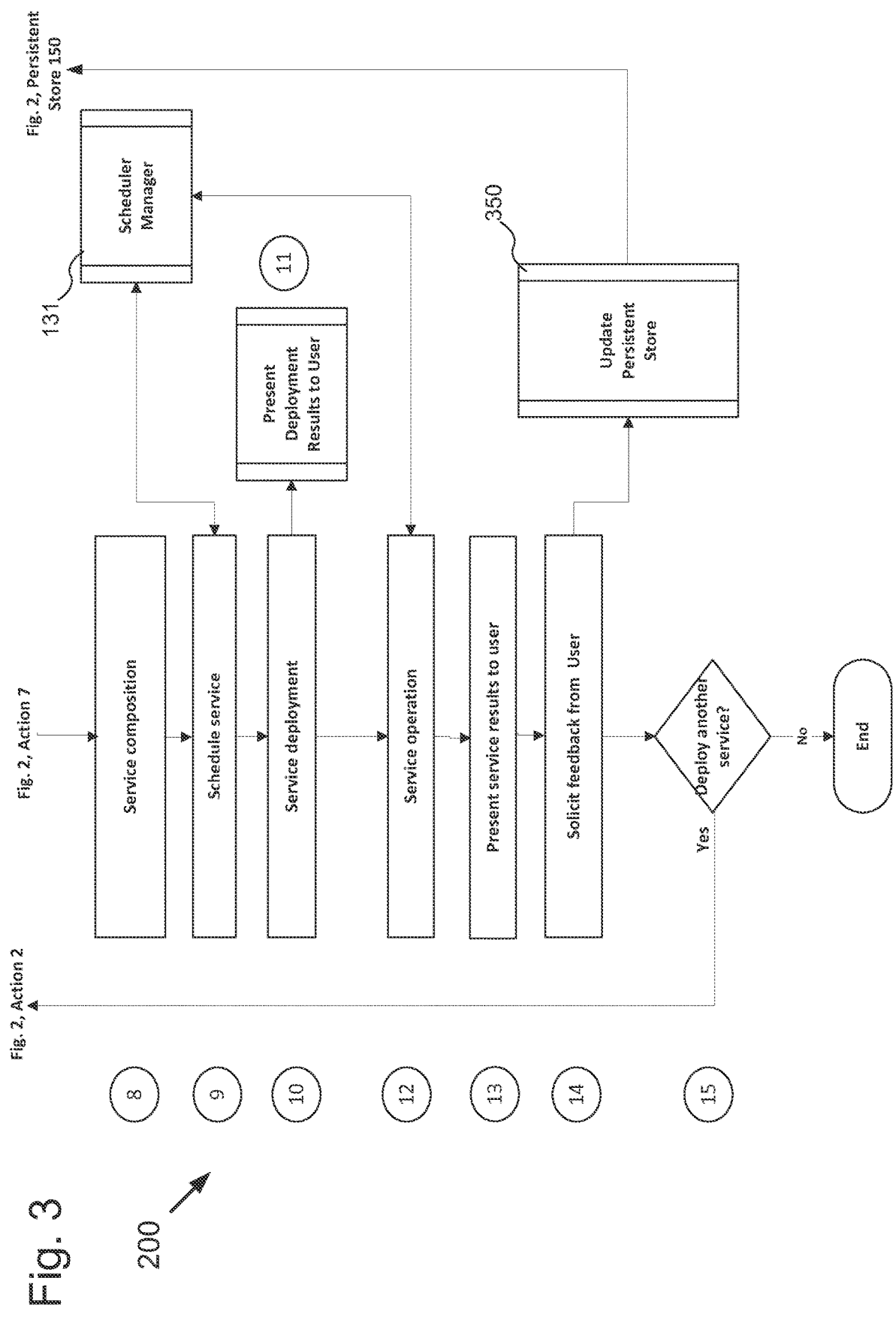
FIG. 3 further illustrates an example process for orchestrating and/or managing services to deployed devices, in accordance with various embodiments.

FIGS. 2 and 3 illustrate an example process 200 for orchestrating and/or managing services to deployed devices, in accordance with various embodiments. While FIGS. 2 and 3 illustrate particular example operations for process 200, in various embodiments, process 200 may include additional operations, omit illustrated operations, and/or combine illustrated operations. In various embodiments, process 200 may be performed by one or more entities of the SOMS 100.

The process may begin at operation 1, where a user credential check may be performed, such as by the UAM 115. In various embodiments, at operation 1 a user may be allowed to create a profile and/or check credentials against a previously created profile. Additionally, in some embodiments, no credential check may be performed, such as if a user is permitted by a configuration of the UAM 115 to access the SOMS 100 as a guest. Next, at operation 2, the UI 118 may present a service catalog to the user. In various embodiments, the service catalog may include one or more services that have been previously generated and/or modified. In various embodiments, the service catalog may include a listing of one or more services that are maintained in the MDC 155. Thus, in various embodiments, a sub-operation 210 may retrieve this listing of one or more services from the PS 150, and more specifically from the MDC 155 and/or the OS 158.

Next, at operation 3, the user may select one or more new services from the service catalogue. At a sub-operation 220, the SOMS may retrieve service details from the PS 150, and in particular from the MDC 155 and/or the OS 158. These service details may be presented to the user through the UI 118. In various embodiments, the service details retrieved at sub-operation 220 may include information received from deployed devices. Such information, in various embodiments, may include device telemetry information which may be sent from a device to the SOMS 100 (e.g., disk space, CPU usage, die temperature, data throughput levels, network interfaces, amount of RAM being used, load averages, etc.). Retrieved device information in various embodiments may also include information such as service metadata, which may be sent from a device to the SOMS 100, and which may include information such as but not limited to, sensor information for devices (e.g., sensor types that devices include or are interfaced with) and task information for devices (e.g. tasks running, estimated completion time, capacity for running further tasks, etc.).

In various embodiments service details which are provided to the user may be condensed or abstracted from those metrics or data which are known to the SOMS 100. For example, a user may be presented with a percentage of devices in a particular deployment area which are online and available, without necessarily presenting information about each particular device.

In various embodiments, the device information, upon being received from devices, may be stored in the PS 150, and more specifically in the OS 158. In various embodiments, historical device- and service-related information may be persisted in the MDC 155 and/or in the OS 158, including multiple versions and configurations of service. In various embodiments, the device and service information which is obtained may be encapsulated and stored, such as in a service orchestration language object ("SOL"). In various embodiments, the SOL may include a Javascript Object Notation/Exentensible Markup Language ("JSON/XML") object. Thus, in various embodiments, the service catalogue and service details which may be presented to the user may be based on historical information available from previously deployed services, and historical information from the devices that the user has available in the IoT infrastructure 140. In various embodiments, the service catalogue presented to a user may therefore be tailored to the user's available IoT infrastructure 140.

Continuing to operation 4, service deployment options may be presented to the user, such as through UI 118. In various embodiments, these service deployment options may be informed through operation 5, where a service suitability analysis may performed. In various embodiments, the service suitability analysis may be performed by the MM 125. In various embodiments, operation 5 may utilize sub-operations 220 and 230, which may retrieve data from the PS 150 for analysis, as well as perform updates to data stored at the PS 150 at sub-operation 240. Additional example implementation details for performance of the service suitability analysis at operation 5 are described below with reference to process 400 of FIG. 4.

Figure 9:
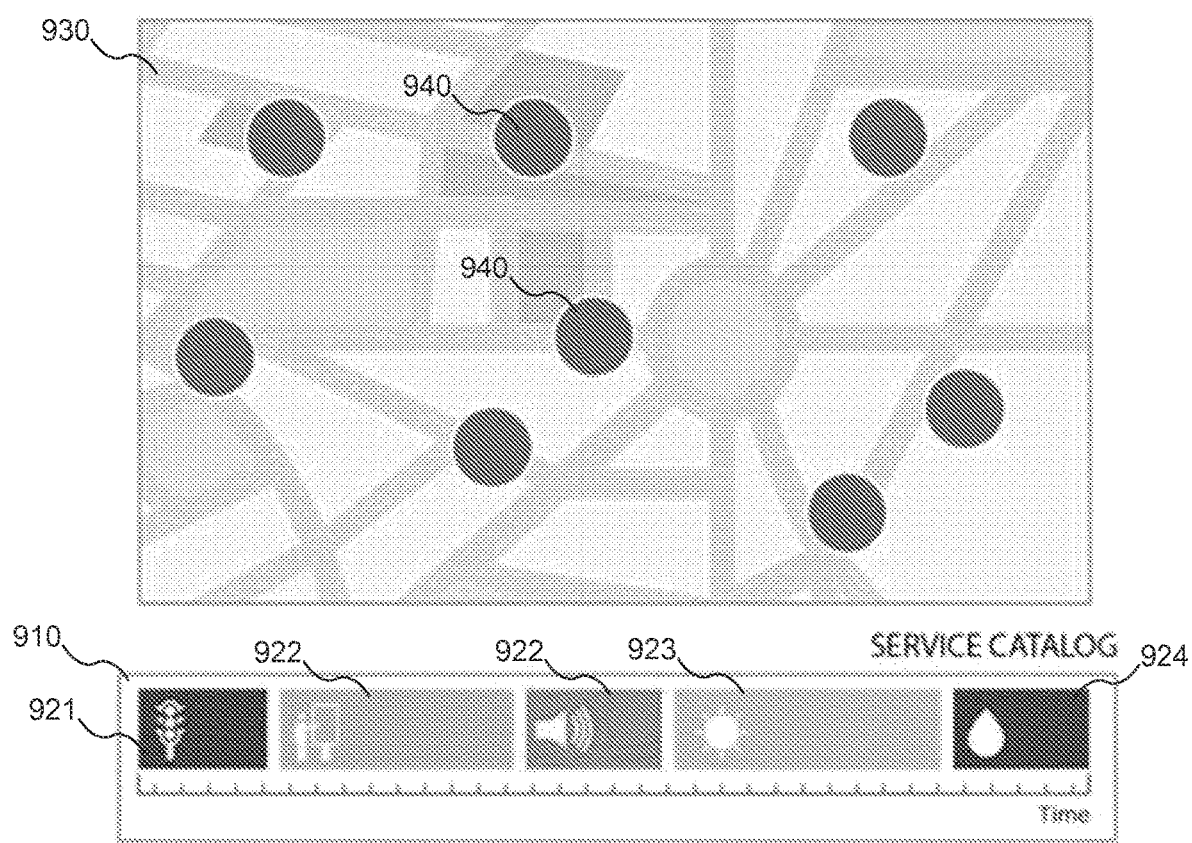
FIGS. 9-11 illustrate example user interfaces for visualizing a service catalog and service deployment options, in accordance with various embodiments.
Figure 10:
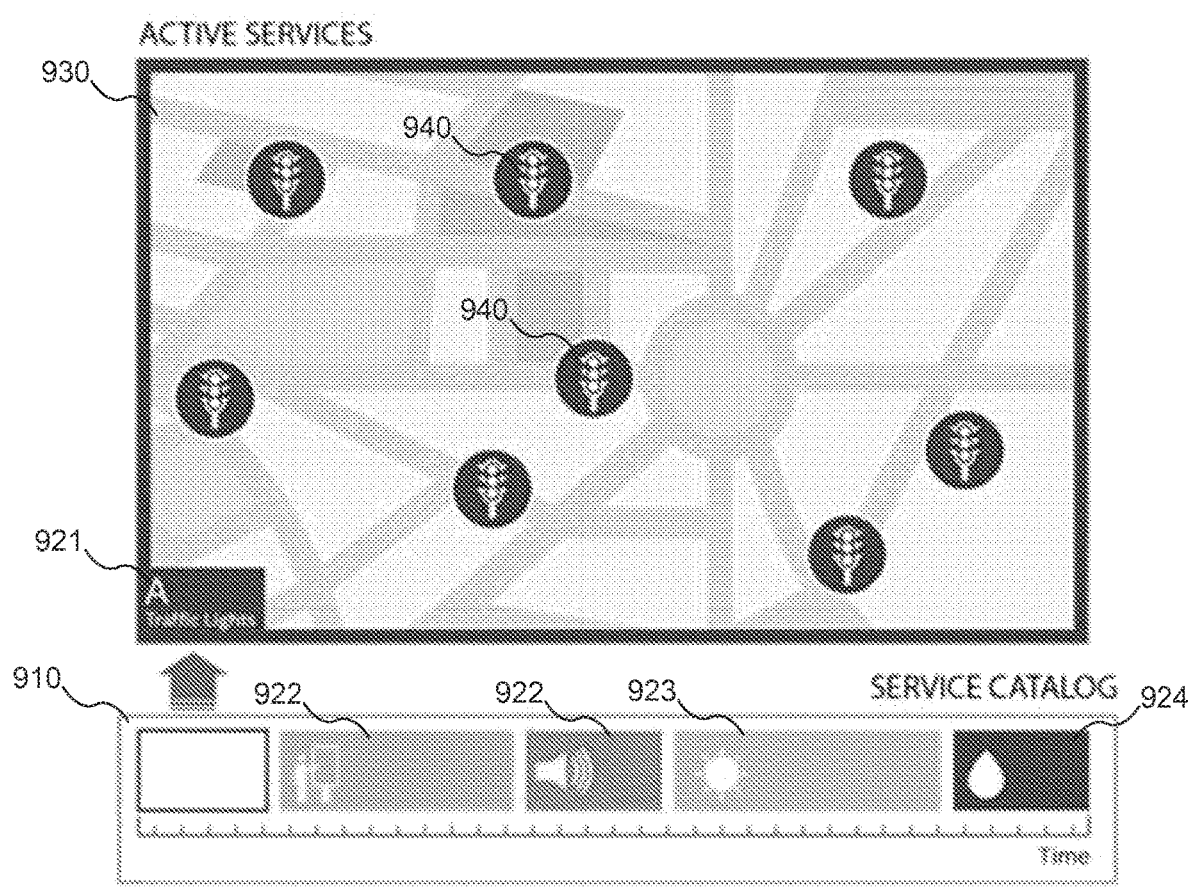
Figure 11:
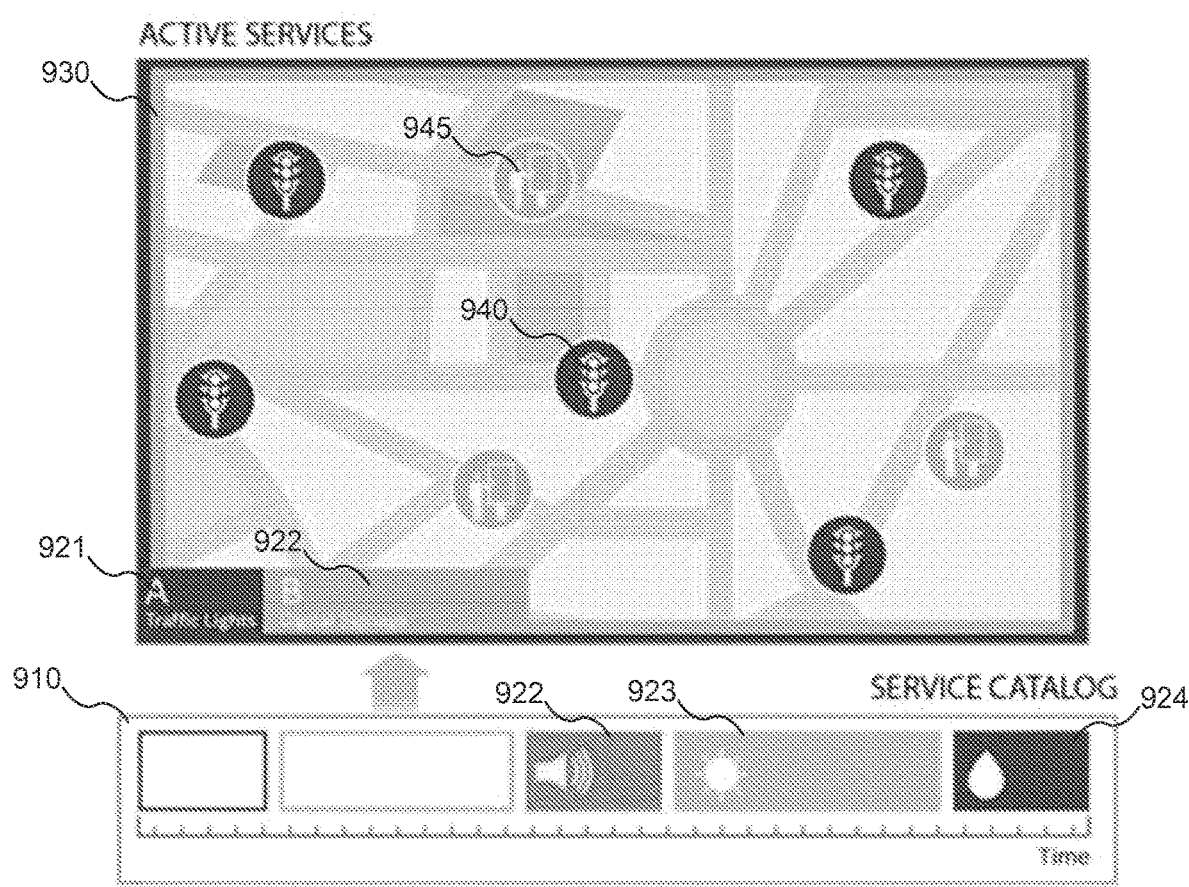

Referring now to FIGS. 9-11, example UI 118s for visualizing a service catalog and service deployment options are illustrated. In the example of FIG. 9, a service catalog 910 is illustrated with multiple user service interface elements 921-925. As illustrated, each of the service user interface elements 921-925 each illustrate a different service which may be performed on one or more deployed devices. While the particular example of FIG. 9 illustrates that the services in the service catalog 910 are presented as graphical icons, in other embodiments, the UI 118 may provide textual descriptions of services, as well as service details. In addition to the service catalog 910, the UI 118 in FIG. 9 also illustrates an example map 930 of a geographical area in which multiple devices have been employed. In various embodiments, the devices may be deployed in a particular service area, for example an area over which a service is desired to be operated; such a service area may coincide with a particular geographical area, but is not necessarily required to be. The devices are represented in FIG. 9 with device user interface elements 940. In the example of FIG. 9 each of the device user interface elements are illustrated as blank, because no service has been selected for display. By contrast, in FIG. 10, a user has selected service user interface element 921, which corresponds to a traffic monitoring service. After selection, in FIG. 10 the UI 118 illustrates that each of the devices represented by the device user interface elements 940 may be utilized in the traffic monitoring service. Continuing to FIG. 11, a user has now also selected service user interface element 922, which corresponds to a digital signage service. In this example, not every deployed device has the needed capabilities to be used in the digital signage service. Thus, after selection of service user interface element 922, in FIG. 11 the UI 118 illustrates that only devices represented by the device user interface elements 945 may be utilized in operation of the selected digital signage service. Thus various embodiments may enable orchestration of multiple services, such as, in the example above, a traffic monitoring service and a digital signage service. Such orchestration may optimize or improve the sharing of available infrastructure for services desired by a user. In various embodiments where devices have the required capabilities for multiple chosen services, then individual device resources may also be orchestrated to deliver those services, enabling one or more individual devices to run multiple services. It may be recognized that, while the examples of FIGS. 9-11 are provided with reference to selection and deployment of services, in other embodiments similar UI 118s may be utilized for visualization of actively operating services, or to present other information to a user.

Returning to FIGS. 2 and 3, at operation 6 the user may customize the service if they wish. In various embodiments, customization may include modification of one or more parameters associated with operation of the service, including timing parameters, data measurement instructions, sensor types, computational instructions, etc. In various embodiments, if the user chooses to customize the service, then the process may return to operation 5 where the service suitability analysis may be performed again. In various embodiments, the user may not customize the service at operation 6 and the process may omit the operation.

At decision operation 7, the user may decide if they wish to deploy the service. This decision may be prompted by the SOMS 100, for example by a query to the user through the UI 118. If the user does not want to deploy the service, then the process may return to operation 2, where the user may review available services and choose an alternative service. However, if the user wishes to deploy the service then, at operation 8 the service may be composed so that it may be deployed to and operated on the various deployed devices such as by the SM 123. In various embodiments, at operation 8, service and network configuration profiles may be created, as well as SOL files for each device to be used in operation of the service. Particular examples of service composition are described below with reference to process 500 of FIG. 5. In alternative embodiments, rather than take place after a decision to deploy the service, service composition of operation 8 may take place before the user confirms that they want to deploy the service.

After composition of the service, the process may proceed to operation 9, where the SCM 131 may schedule service deployment. In various embodiments, scheduling of services may include a queuing mechanism. In other embodiments, scheduling may include an on-demand mechanism. In various embodiments, the scheduling may be configured to enable both service deployment and reconfiguration. Next, at operation 10 the service may be deployed to the devices. In various embodiments, deployment may include transmission of executable files to the deployed devices which may operate the service. In various embodiments, these executable files may be binaries which may execute natively on the deployed devices. In other embodiments, the executable files may include non-native code, such as may be run in an interpreter or just-in-time compiler on one or more of the devices. In various embodiments, the executable files may include binaries that are maintained by the SOMS 100, such as on the PS 150 for deployment to devices. In other embodiments, the DM 128 may be configured to compile binary variants in association with deployment. In various embodiments, different classes of devices may have different binaries deployed to them as may better suit the device system and resources. Additionally, during service deployment, configuration items may be sent to devices; for example the SOMS 100 may configure a network interface that devices are to use, sensor duty cycle, etc. Particular examples of service deployment are discussed below with reference to process 600 of FIG. 6. After deployment, at operation 11, the UI 118 may present deployment results to the user. Such results may include the number and/or identity of devices to which the service is deployed, estimated time of completion, likelihood of successful completion, etc.

Next, at operation 12, the service may begin operation. During operation, the one or more devices to which the service was deployed may perform activities as directed by the service, and as specifically directed by the executable files and/or configuration items deployed to the one or more devices. Activities may include retrieval of sensor data, storage of data, computations on collected data, M2M communications between devices, sending data to a gateway, etc. In various embodiments, the SM 131 may control service operation, such as by directing the schedule of performance of service activities at various devices. At operation 13, the SOMS 100 may present results from the operation of the service to the user. Such results may include data representing findings or computations from the service and/or error messages. Next, at operation 14, the SOMS 100, such as through the UI 118, may solicit feedback from the user, and feedback may be received. In various embodiments, the feedback received may be related to the service which was deployed and operated and/or one or more of the devices on which the service was deployed. Received feedback may be sent to the PS 150 at sub-operation 350, such as to aid the user, or other users, in selecting services in the future. Next, at decision operation 15, the user may determine if they wish to select and deploy another service. If so, then the process may return to operation 2. If not, then the process may end.

Figure 4:
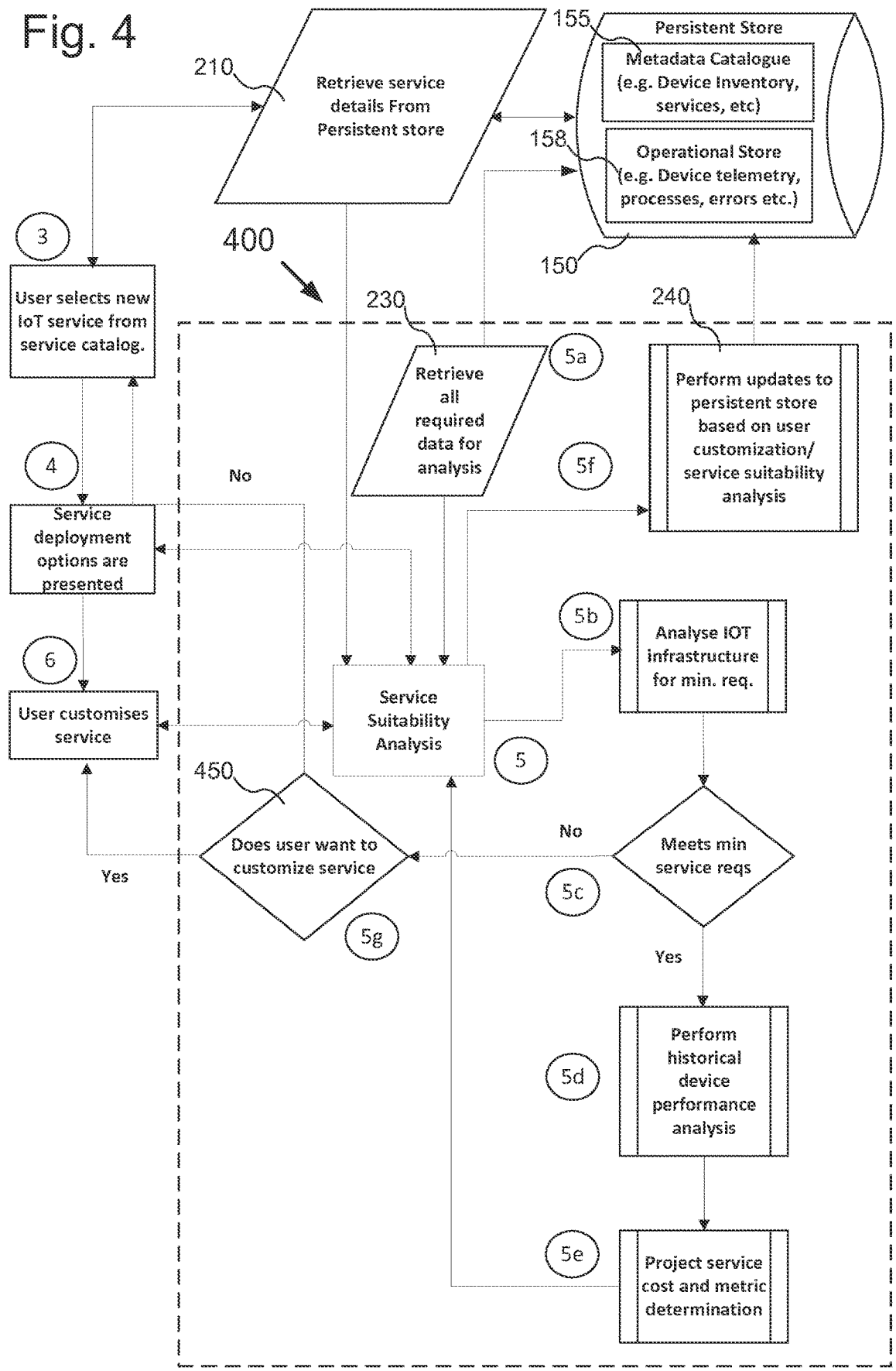
FIG. 4 illustrates an example process for performing service suitability analysis, in accordance with various embodiments.

FIG. 4 illustrates an example process 400 for performing service suitability analysis at operation 5, in accordance with various embodiments. While FIG. 4 illustrates particular example operations for process 400, in various embodiments, process 400 may include additional operations, omit illustrated operations, and/or combine illustrated operations. In various embodiments, the service suitability analysis is performed, such as by the MM 125, to analyze and estimate the ability of the IoT infrastructure 140 to support an intended service (such as one selected at operation 3 and/or 4 and/or modified by the user at operation 6). At sub-operation 5a (sub-operation 230 of FIGS. 2 and 3) data required for the analysis may be retrieved from the PS 150.

At sub-operation 5b, the MM 125 may analyze the IoT infrastructure 140 to determine the suitability of the IoT infrastructure 140 to support minimum service requirements. In various embodiments, these determinations may be based on service details retrieved at sub-operation 210 as well as the device data retrieved at sub-operation 5a. In various embodiments, at sub-operation 5b, the MM 125 may determine whether the IoT infrastructure may support the service within a particular intended geographical region over which a service is to be deployed. For example, the MM 125 may, as part of the analysis of sub-operation 5b, determine Euclidian distances between points on a desired route and the locations of one or more devices which may be utilized for service performance. Thus, the MM 125 may compute:

$$d[n]_{s,i} = \sqrt{(x[n]_i - r[n]_i)^2 + (x[n]_j - r[n]_j)^2}$$

where $x[n]_i$ and $x[n]_j$ are the respective real and imaginary components of the device location expressed as a complex-valued number, $r[n]_i$ and $r[n]_j$ are the respective real and imaginary components of the desired device location expressed as a complex-valued number, and $d[n]_{st}$ is the calculated Euclidean distance.

Using this calculation, the MM 125 may then select the node with has a minimum calculated Euclidean distance to the desired device location through computation of:

$$K[n] = \min_i \|d\|$$

where d is the Euclidean distance array of values computed above and K[n] is the nth element of the selected node array where each of the selected node locations are associated with the minimum Euclidean distances. Referring now to FIG. 8, an example map 810 is shown with a selection of devices 835, which minimize distance to a preferred route 825 over which a service is desired to be computed. It will be appreciated by one skilled in the art that the formula for computing a Euclidian distance is presented for exemplary purposes only and that another formula (for this or another type of function) may be used without departing from the spirit and intent of the present disclosure.

Returning to FIG. 4, the MM 125 may also determine the suitability of the IoT infrastructure 140 to support service characteristics. For example a first responder emergency communications network may require low latency, high throughput communications, while a sensor application may be configured to tolerate lower throughput and higher network latency. In various embodiments, the determination at sub-operation 5b may be performed with relation to all deployed devices, or only a subset of the deployed devices, such as those devices which are currently operational or currently not too busy with other tasks.

At decision sub-operation 5c, the MM 125 may determine whether minimum service requirements may be met. If not, then the process may proceed to decision sub-operation 5g, where it may be determined whether the user wishes to customize the service (such as through a user query using the UI 118). If so, the SOMS 100 may proceed to operation 6 to perform a customization. If not, the SOMS 100 may proceed to operation 3, where the user may select a new service. If, however at decision sub-operation 5c the MM 125 determines that the IoT infrastructure does meet minimum service requirements, then at sub-operation 5d, the MM 125 may analyze historical performance of available devices in the IoT infrastructure 140. Such analysis may include analysis of individual device performance metrics, reliability, data throughput, connectivity, availability of suitable sensors for a sensor driven service, etc. In various embodiments, this data may be persisted in the MDC 155 and/or the OS 158 of the PS 150 and retrieved at sub-operation 5a. Next, at sub-operation 5e, the MM 125 may project a cost estimate and/or a service suitability metric for deployment of the service on the IoT infrastructure. In various embodiments, cost estimates may include determination of actual costs which are accrued in order to utilize particular devices. In other embodiments, the service suitability metric may include a determination of how valuable or suitable any resulting data may be to the user. For example, the metric may be computed relative to the ability of available devices to store sufficient data to determine statistically significant results for a particular outcome, or to capture data during a desired time period.

In various embodiments, in order to calculate the service suitability metric, the MM 125 may calculate a normalized sum of node metrics corresponding to aggregate devise performance and applicability values. The MM 125 may thus compute:

$$M_p = \frac{1}{N}\sum_{n=0}^{N} M[n]_p * W_p$$

$$M_r = \frac{1}{N}\sum_{n=0}^{N} M[n]_r * W_r$$

$$M_c = \frac{1}{N}\sum_{n=0}^{N} M[n]_c * W_c$$

where: $M_p$ denotes a normalized aggregate figure of merit for the selected device power availability; $M_r$ denotes a normalized aggregate figure of merit for the selected device reliability; $M_c$ denotes a normalized aggregate figure of merit for the selected device connectivity; $M[n]_p$, $M[n]_r$, and $M[n]_c$ denote power, reliability, and connectivity metrics for the nth selected device, respectively; and $W_p$, $W_r$, and $W_c$ denote power, reliability, and connectivity weightings applied to each of the device metrics. For example, with respect to the weightings, for a service requiring a network of highly connected devices, that service may have a higher weighting applied to connectivity.

After computation of individual aggregated device metrics, the individual metrics may be averaged to produce an overall estimated service suitability metric, M, for the available IoT infrastructure 140's ability to support an intended service:

$$M = \frac{1}{N_{metric}}(M_p + M_r + M_c)$$

where $N_{metric}$ is the number of aggregated device metrics (3 in the given example).

After the cost and/or service suitability metric figure is determined at sub-operation 5e, at sub-operation 5f the MM 125 may update the PS 150 with data from the analysis. Operation 5 may then end. It will be appreciated by one skilled in the art that the formula for computing a service suitability metric is presented for exemplary purposes only and that another formula (for this or another type of function) may be used without departing from the spirit and intent of the present disclosure.

Figure 5:
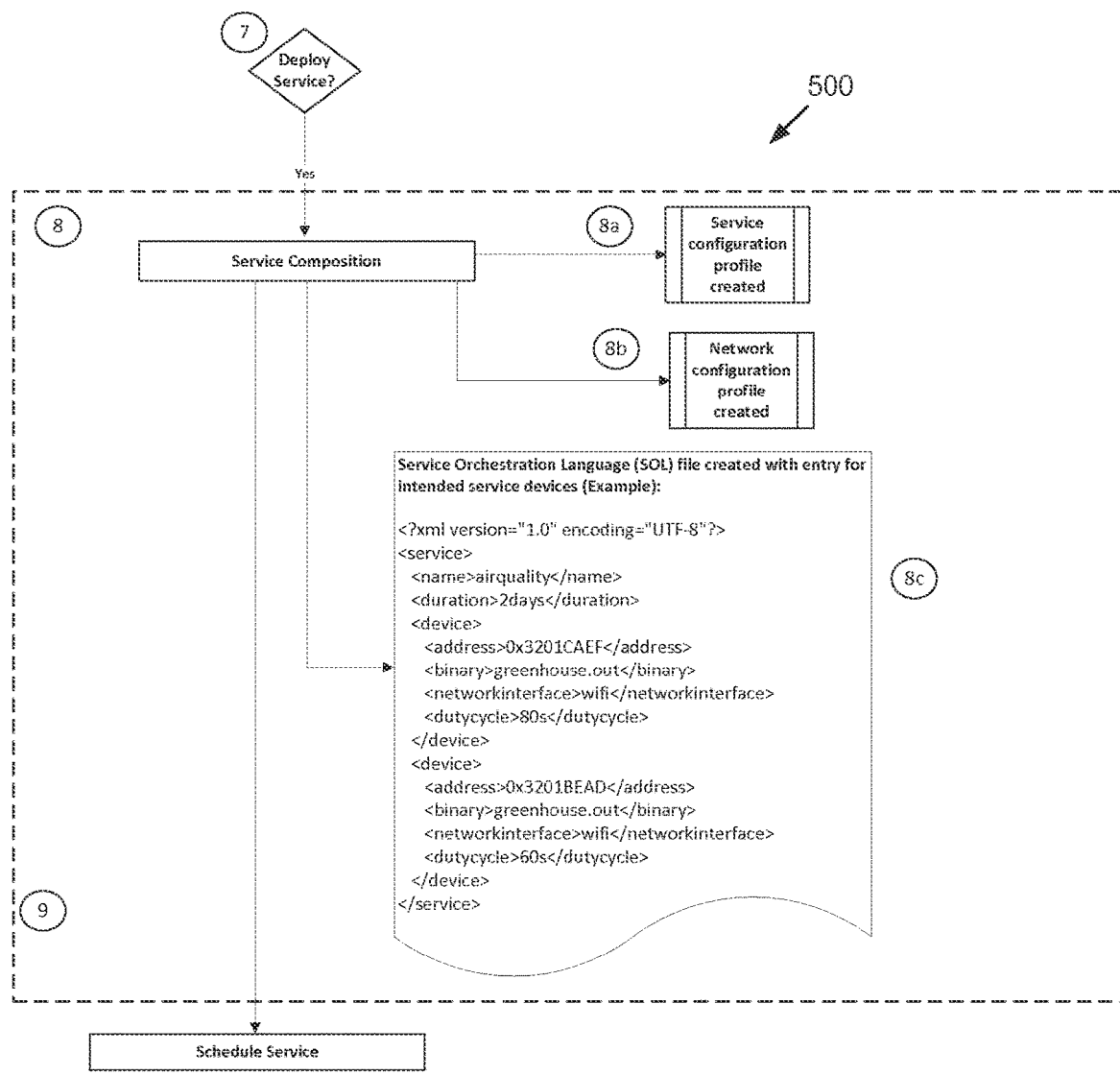
FIG. 5 illustrates an example process for performing service composition, in accordance with various embodiments.

FIG. 5 illustrates an example process 500 for performing service composition at operation 8, in accordance with various embodiments. While FIG. 5 illustrates particular example operations for process 500, in various embodiments, process 500 may include additional operations, omit illustrated operations, and/or combine illustrated operations. In various embodiments, SM 123 may perform one or more operations of process 500. During operation 8, at sub-operation 8a, a service configuration profile may be created for the service. In various embodiments, service configuration profiles may be made up of one or more service configuration items. By specifying or setting one or more service configuration items, the associated service configuration profile can be customized Service configuration profiles (which may enable specification of per-service configuration items), may be combined with network configuration profiles (which may enable specifying network configuration parameters), and other information to specify or customize a service profile. In various embodiments, the service configuration profile may include, for example, information such as service name, duration of the service, as well as information for one or more devices such as a device address, an indication of an executable file to be uploaded (e.g., a file name), a sensor duty cycle indicator, etc. Examples of such information may be seen at sub-operation 8c, where a SOL is displayed containing information for multiple devices; sub-operation 8c is described in greater detail below.

In one example of a configuration item that can form part of a service configuration profile, a sensor duty cycle may be indicated. The sensor duty cycle configuration item may be set to specify a regularity metric for upload of sensor data from a device. For example, in an air quality service, an air quality sensing device in one geographical area may be configured to upload data once a minute, while in another geographical location such a sensing device may be configured to upload data once an hour, or once a day, etc. In another example, a configuration item may specify that data should be aggregated before being sent to the SOMS 100.

In another example, a configuration item may specify the data that a sensing device sends to the MMM 139. For example a configuration item may specify metric tags that are set up for a particular service. In yet another example, a configuration item may specify local data management on a device, specifying, for example how large log files are allowed become, how many log files should be maintained, log rotation, the time intervals between each run of the local data management cycle etc.

Next, at operation 8b, a network configuration profile may be created for the service, which may direct configuration of the network to support M2M communications between the selected devices on which the service is to be deployed. An example of a configuration item for a network configuration profile may specify a network communications protocol or interface to be used by a device for sending data to a gateway, e.g. WiFi, cellular, fiber, Ethernet, and/or other suitable communication means. In various scenarios, different protocols may be specified because some services may require greater network throughput, or lower latency, than others. Thus, a high frequency time critical service may utilize high network throughput and low latency, while in an alternative service lower network throughput and higher latency may suffice. For example a first responder emergency communications network may require low latency, high throughput communications, while a sensor application may be configured to tolerate lower throughput and higher network latency. A network configuration item may therefore facilitate customization of the service profile to configure a device to use the network communications protocol or interface most suitable for a service.

Additionally, at sub-operation 8c, a SOL file may be created for the service, which may include the output of sub-process 8a and the output of sub-process 8b. In various embodiments service configuration profiles (which may enable specifying per-service configuration items, including indication(s) of executable file(s) to be uploaded), may be combined with network configuration profiles (which may enable specifying per-network configuration items) to enable specifying or customization of a service profile. In various embodiments, the SOL may include service-level information, such as service name, a start time, conditional start instructions, delayed start instructions, and/or a time to live associated with the service. The SOL may also include entries for devices which are to be used with the service, such as device address, runtime, executable files, network interface, duty cycle, etc. In various embodiments, the SOL may include an XML file or may be encapsulated and stored as an object, which could for example be a JSON/XML object.

Figure 6:
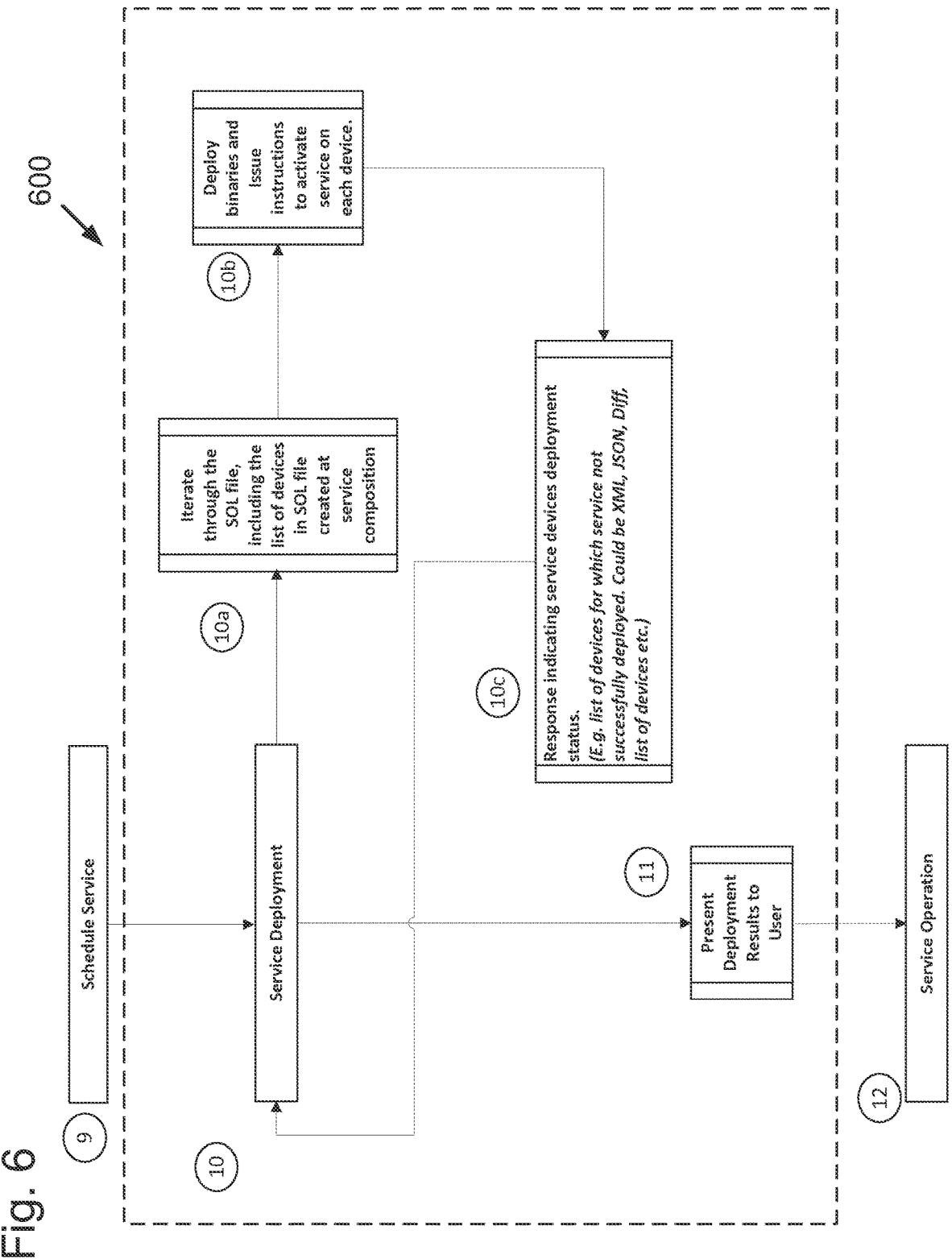
FIG. 6 illustrates an example process for performing service deployment, in accordance with various embodiments.

FIG. 6 illustrates an example process 600 for performing service deployment, in accordance with various embodiments. While FIG. 6 illustrates particular example operations for process 600, in various embodiments, process 600 may include additional operations, omit illustrated operations, and/or combine illustrated operations. In various embodiments, DM 128 may perform one or more operations of process 600. The process may begin at operation 10a, where the DM 128 may iterate through the SOL created at service composition, and in particular through the list of devices in SOL file. At operation 10b, the DM 128 may deploy executable files as well as configuration items from the SOL to the particular devices to which they are associated and issue instructions to operate the service on each device. Next, at operation 10c, the DM 128 may receive information for devices for which the service could not be deployed and a response indicating service devices deployment status. In various embodiments, this response could be implemented as, for example, XML, JSON, etc. These results may be presented to the user at operation 11, as discussed above. Process 600 may then end. In one embodiment, during service deployment the service configuration profile created at step 8a (illustrated in FIG. 5) and the network configuration profile created at step 8b (illustrated in FIG. 5) may be deployed. During service deployment the DVM 137 may connect to each device indicated in the SOL and may transfers the executable files and configuration instructions to the devices. Thus, in various embodiments, for example at service deployment, service profiles for one or more services, which may include service configuration profiles and/or network configuration profiles, as well as associated configuration parameters and pertinent executable files, may be deployed by one or more control messages originating from the DVM 137. These control messages may be deployed to one or more devices and instructions may be issued to operate the one or more services on each device. In various embodiments, the instructions may be encapsulated in the configuration parameters or may be maintained independent of them; in other embodiments, a combination of configuration parameters and other techniques may be used. In addition to being used during service deployment, service command messages/service profile messages (e.g., messages which include information or messages pertaining to service configuration profiles and/or network configuration profiles) may also be sent to devices during other applicable phases. For example, service command messages/service profile messages may be sent during service operation. In one such example, the DVM 137, while analyzing data it accesses on or receives from the PS 150, may ascertain that one or more devices should change to a different network communications protocol or interface. The DVM 1367 may then originate a service command message encapsulating a configuration item for a network configuration profile specifying a network communications protocol or interface to be used by a device for sending data to a gateway. Such service command message may result in the device being configured to begin using the specified interface for sending data to the gateway.

Figure 7:
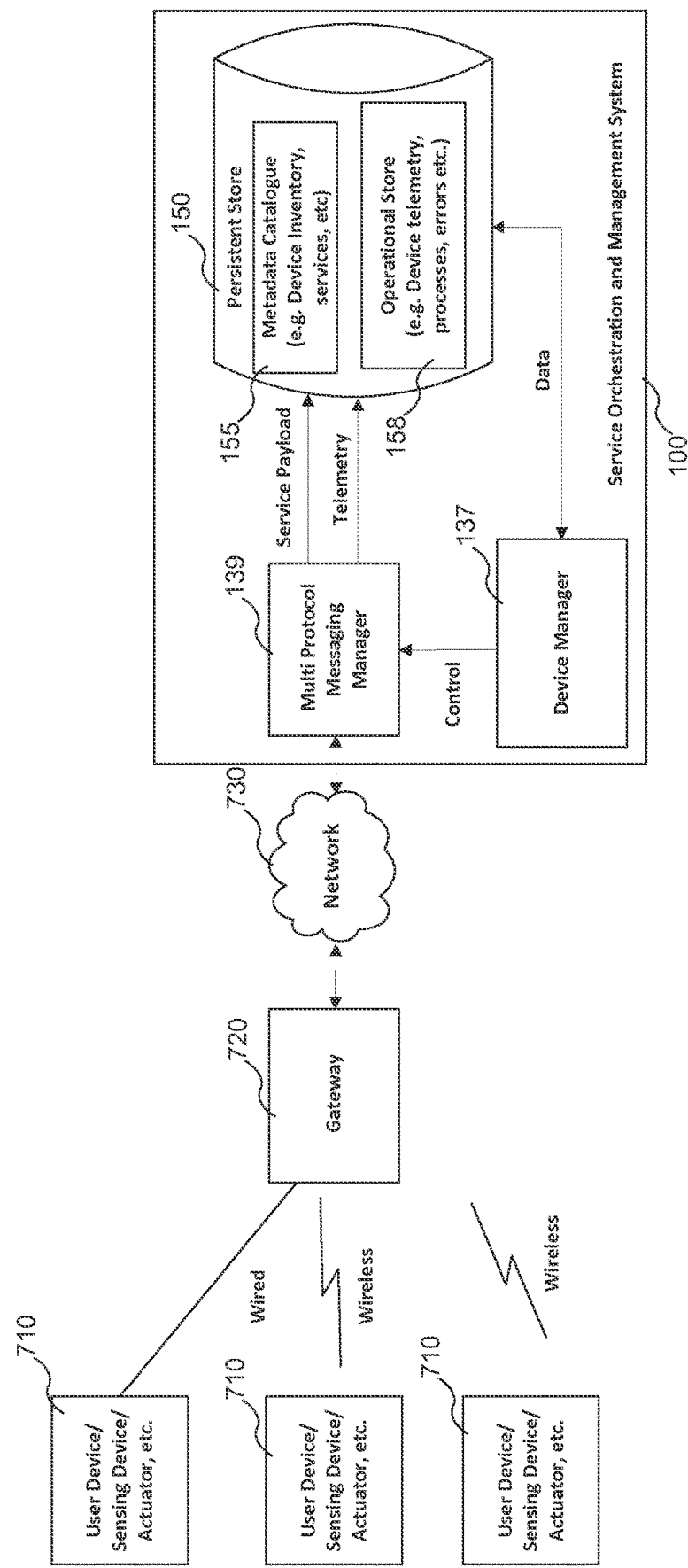
FIG. 7 illustrates example communications between deployed devices and components of the service orchestration and management system, in accordance with various embodiments.

FIG. 7 illustrates example communications between deployed devices 710 and components of the service orchestration and/or management system, in accordance with various embodiments. In various embodiments, multiple devices 710 (e.g. user devices, sensing devices, actuator devices, etc.) may be utilized for operations of services. In various embodiments, these may be in wired and/or wireless communication via heterogeneous communications means (e.g., IEEE 802.11, IEEE 802.15.4) with a gateway 720. The gateway 720 may communicate via a network 730 (such as a backhaul network including, but not limited to: WiFi, cellular, fiber, Ethernet, or other suitable communication means) to the MMM 139. In various embodiments an agent such as a service orchestration agent may be installed on one or more of the devices 710 illustrated in FIG. 7 and may communicate with the SOMS (not illustrated).

As discussed above, the MMM 139 may be configured to manage dispatching control messages on a control plane between all the devices and service orchestration. The MMM 139 may also manage data such as telemetry messages which may be sent from a device to the MMM 139 (e.g., metric measurements, sensor measurements etc.), executable files for services, events etc. between the devices and service orchestration. The MMM 139 may thus handle many different types of messages including service pay load messages, telemetry messages, actuation messages, service command messages. As discussed above, service command messages may for example, include or encapsulate messages pertaining to service profile messages, which may include information or messages pertaining to service configuration profiles and/or network configuration profiles. The MMM 139 may be configured to provide service payload and telemetry information, control information, event information, and other information to the PS 150 for storage, as well as to receive messages from the DVM 137 for delivery to one or more devices. For example, as discussed above, the MMM 139 may receive messages from the DVM 137 configured to bring devices online and offline, provide software updates, schedule device reboots, schedule periodic testing of devices, originate control messages that result in device configuration and maintenance being performed, etc.

Figure 12:
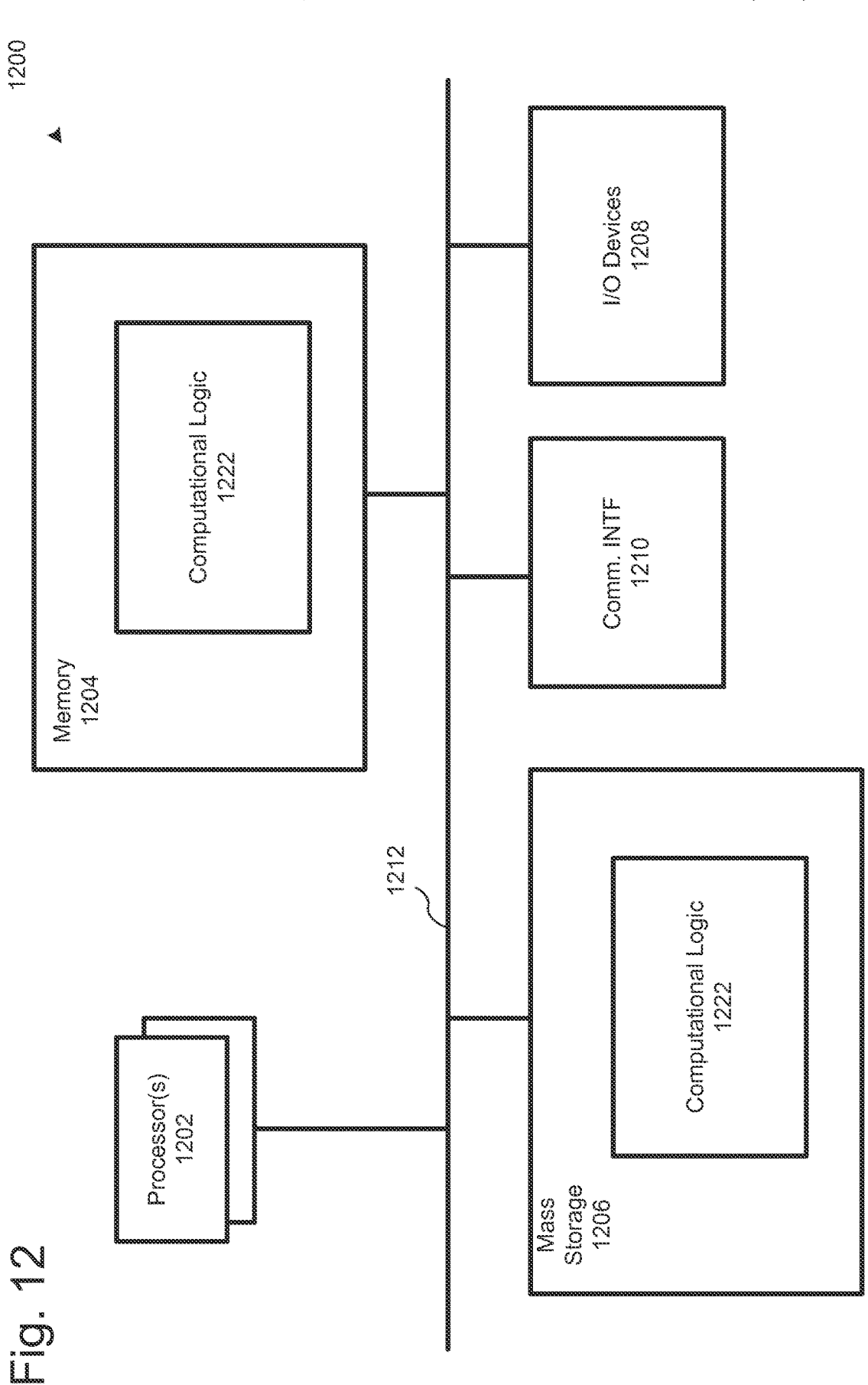
FIG. 12 illustrates an example computing environment configured to practice various aspects of the present disclosure, in accordance with various embodiments.

Referring now to FIG. 12, an example computer suitable for practicing various aspects of the present disclosure, including processes of FIGS. 2-7, is illustrated in accordance with various embodiments. As shown, computer 1200 may include one or more processors or processor cores 1202, and system memory 1204. For the purpose of this application, including the claims, the terms "processor" and "processor cores" may be considered synonymous, unless the context clearly requires otherwise. Additionally, computer 1200 may include mass storage devices 1206 (such as diskette, hard drive, compact disc read only memory (CD-ROM) and so forth), input/output devices 1208 (such as display, keyboard, cursor control, remote control, gaming controller, image capture device, and so forth) and communication interfaces 1210 (such as network interface cards, modems, infrared receivers, radio receivers (e.g., Bluetooth), and so forth). The elements may be coupled to each other via system bus 1212, which may represent one or more buses. In the case of multiple buses, they may be bridged by one or more bus bridges (not shown).

Each of these elements may perform its conventional functions known in the art. In particular, system memory 1204 and mass storage devices 1206 may be employed to store a working copy and a permanent copy of the programming instructions implementing the operations associated with orchestration and/or management of services, collectively referred to as computing logic 1222. The various elements may be implemented by assembler instructions supported by processor(s) 1202 or high-level languages, such as, for example, C, that can be compiled into such instructions.

The permanent copy of the programming instructions may be placed into permanent storage devices 1206 in the factory, or in the field, through, for example, a distribution medium (not shown), such as a compact disc (CD), or through communication interface 1210 (from a distribution server (not shown)). That is, one or more distribution media having an implementation of the agent program may be employed to distribute the agent and program various devices.

The number, capability and/or capacity of these elements 1210-1212 may vary. Their constitutions are otherwise known, and accordingly will not be further described.

Figure 13:
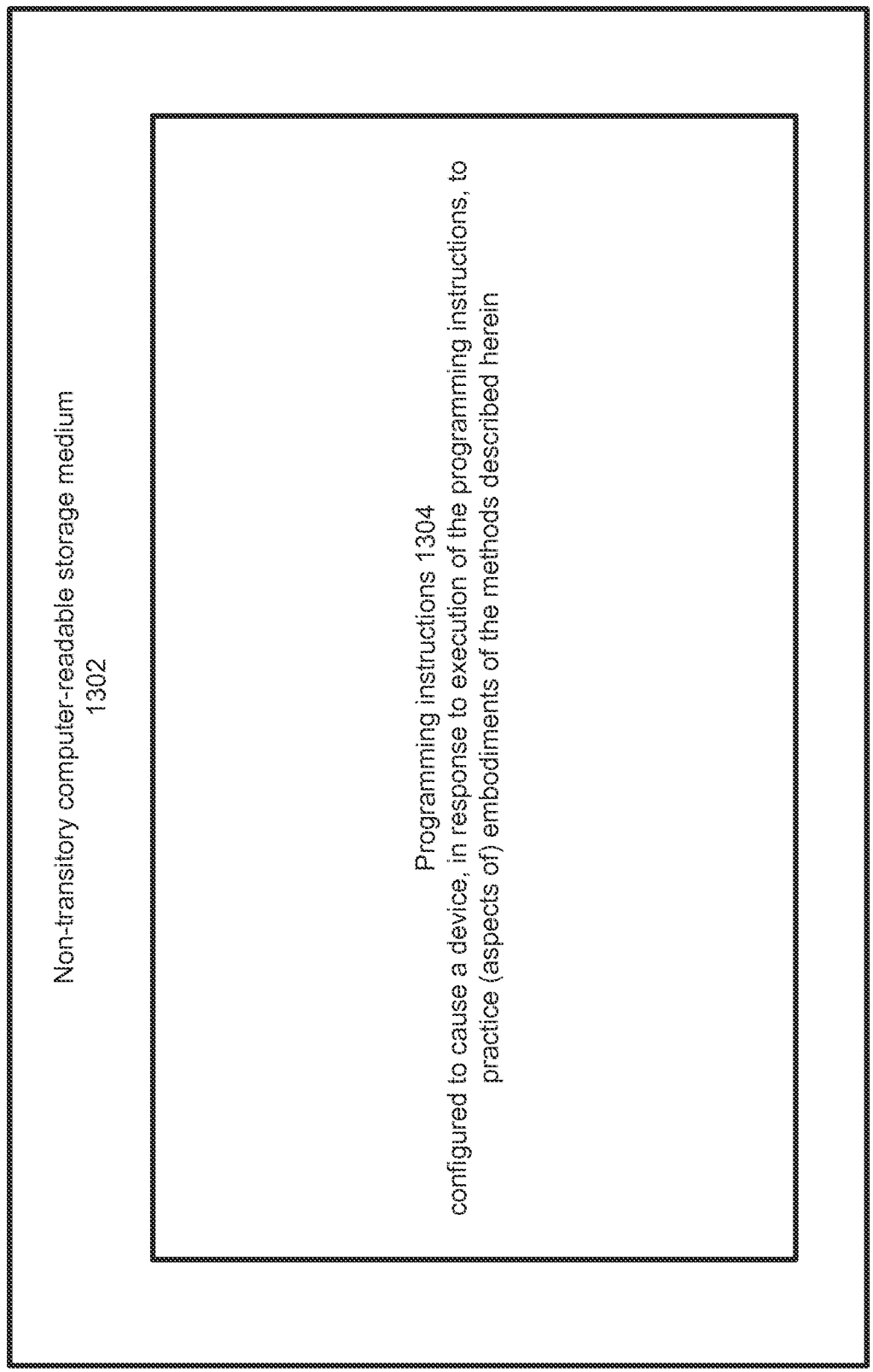
FIG. 13 illustrates an example storage medium with instructions configured to enable an apparatus to practice various aspects of the present disclosure, in accordance with various embodiments.

FIG. 13 illustrates an example least one computer-readable storage medium 1302 having instructions configured to practice all or selected ones of the operations associated with orchestration and/or management of services, in accordance with various embodiments. As illustrated, at least one computer-readable storage medium 1302 may include a number of programming instructions 1304. Programming instructions 1304 may be configured to enable a device, e.g., computer 1200, in response to execution of the programming instructions, to perform, e.g., various operations of processes of FIGS. 2-7. In alternate embodiments, programming instructions 1304 may be disposed on multiple least one computer-readable storage media 1302 instead. Examples of computer-readable storage medium 1302 may include one of a number of known non-transitory persistent storage medium. In alternate embodiments, computer-readable storage medium 1302 may include transitory medium, such as signals.

Referring back to FIG. 12, for one embodiment, at least one of processors 1202 may be packaged together with memory having computational logic 1222 configured to practice aspects of processes of FIGS. 2-7. For one embodiment, at least one of processors 1202 may be packaged together with memory having computational logic 1222 configured to practice aspects of processes of FIGS. 2-7 to form a System in Package (SiP). For one embodiment, at least one of processors 1202 may be integrated on the same die with memory having computational logic 1222 configured to practice aspects of processes of FIGS. 2-7. For one embodiment, at least one of processors 1202 may be packaged together with memory having computational logic 1222 configured to practice aspects of processes of FIGS. 2-7 to form a System on Chip (SoC). For at least one embodiment, the SoC may be utilized in, e.g., but not limited to, a computing tablet.

Various embodiments of the present disclosure have been described. These embodiments include, but are not limited to, those described in the following paragraphs.

Example 1 may include a system for facilitating usage of deployed devices. The system may include one or more computing processors. The system may also include service orchestration logic to be operated on the one or more computing processors to obtain data for one or more deployed devices and determine capabilities of the one or more devices. The system may also include service management logic to be operated on the one or more computing processors to determine a service to be performed by selected devices of the one or more deployed devices; select, from the one or more deployed devices, the selected devices;

and deploy the service to the one or more selected devices for performance of the service.

Example 2 may include the system of example 1, wherein the service orchestration logic may be to obtain data through collection of telemetry information for the one or more deployed devices.

Example 3 may include the system of example 2, wherein the telemetry information may include one or more of: storage space, processor usage, temperature, data throughput, network capabilities, memory usage, and load averages.

Example 4 may include the system of example 1, wherein the service orchestration logic may be to obtain data through collection of service payload information for the one or more deployed devices.

Example 5 may include the system of any of the above system examples, wherein the service orchestration logic may be to obtain data through collection of service metadata for the one or more deployed devices.

Example 6 may include the system of example 5, wherein the service metadata may include one or more of: identification of currently running tasks, estimated task completion time, capacity for running additional tasks, and sensor types devices are connected to.

Example 7 may include the system of any of the above system examples, wherein the service management logic may be further to perform a service suitability analysis to determine suitability of the one or more deployed devices to perform the service.

Example 8 may include the system of example 7, wherein the service management logic may be to perform the service suitability analysis through analysis of one or more of: geographical location of the one or more deployed devices, abilities of the one or more deployed devices to perform characteristics of the service, and historical performance of the one or more deployed devices.

Example 9 may include the system of any of the above system examples, wherein the service management logic may be to deploy the service through generation of a service descriptor.

Example 10 may include the system of example 9, wherein the service descriptor may include an identification of the service.

Example 11 may include the system of example 9, wherein the service descriptor may include an entry for each of the selected devices including an executable file for each of the selected devices.

Example 12 may include the system of example 11, wherein service management logic may be further to deploy the service through deployment of the executable files to the selected devices.

Example 13 may include the system of example 9, wherein the service descriptor may include an entry for each of the selected devices including configuration information for each of the selected devices.

Example 14 may include the system of example 9, wherein the service descriptor may include instructions to direct different devices to perform different activities.

Example 15 may include the system of example 14, wherein the service descriptor may include, for a first device, instructions to perform a different activity than was previously performed by the first device when executing a previous service.

Example 16 may include the system of any of the above system examples, wherein the selected service may be a first service and the service management logic may be to repeat the determine, select, and deploy with respect to the one or more deployed devices for a second service other than the first service.

Example 17 may include the example of example 17, wherein the first service may be operated on a first set of selected devices of the one or more deployed devices, the second service may be operated on a second set of selected devices of the one or more deployed devices, and the first and second sets of selected devices may be different.

Example 18 may include the system of any of the above system examples, wherein the service management logic may be to determine a service through:
presentation of service options to a user; and
receipt of a selected service from the user.

Example 19 may include the system of any of the above system examples, wherein the service management logic may be further to determine a service through receipt of modifications to a service from a user.

Example 20 may include the system of any of the above system examples, wherein the service orchestration logic may be to obtain data from agents operating on the one or more deployed devices Example 21 may include one or more non-transitory computer-readable media containing instructions written thereon that, in response to execution on a computing system, may cause the computing system to facilitate usage of deployed devices. The instructions may cause the computing system to: obtain data for one or more deployed devices; determine capabilities of the one or more devices; determine a service to be performed by selected devices of the one or more deployed devices; select, from the one or more deployed devices, the selected devices; and deploy the service to the one or more selected devices for performance of the service.

Example 22 may include the non-transitory computer-readable media of example 21, wherein obtain data may include collect telemetry information for the one or more deployed devices.

Example 23 may include the non-transitory computer-readable media of example 22, wherein the telemetry information may include one or more of: storage space, processor usage, temperature, data throughput, network capabilities, memory usage, and load averages.

Example 24 may include the non-transitory computer-readable media of example 21, wherein obtain data may include collect service payload information for the one or more deployed devices.

Example 25 may include the non-transitory computer-readable media of any of examples 21-24, wherein obtain data may include collect service metadata for the one or more deployed devices.

Example 26 may include the non-transitory computer-readable media of example 25, wherein the service metadata may include one or more of: identification of currently running tasks, estimated task completion time, capacity for running additional tasks, and sensor types devices are connected to.

Example 27 may include the non-transitory computer-readable media of any of examples 21-26, wherein the instructions may be further to cause the computing system to perform a service suitability analysis to determine suitability of the one or more deployed devices to perform the service.

Example 28 may include the non-transitory computer-readable media of example 27, wherein perform the service suitability analysis may include analyze one or more of: geographical location of the one or more deployed devices, abilities of the one or more deployed devices to perform characteristics of the service, and historical performance of the one or more deployed devices.

Example 29 may include the non-transitory computer-readable media of any of examples 21-28, wherein deploy the service may include generate a service descriptor.

Example 30 may include the non-transitory computer-readable media of example 29, wherein the service descriptor may include an identification of the service.

Example 31 may include the non-transitory computer-readable media of example 29, wherein the service descriptor may include an entry for each of the selected devices including an executable file for each of the selected devices.

Example 32 may include the non-transitory computer-readable media of example 31, wherein deploy the service may include deploy the executable files to the selected devices.

Example 33 may include the non-transitory computer-readable media of example 29, wherein the service descriptor may include an entry for each of the selected devices including configuration information for each of the selected devices.

Example 34 may include the non-transitory computer-readable media of example 29, wherein the service descriptor may include instructions to direct different devices to perform different activities.

Example 35 may include the non-transitory computer-readable media of example 34, wherein the service descriptor may include, for a first device, instructions to perform a different activity than was previously performed by the first device when executing a previous service.

Example 36 may include the non-transitory computer-readable media of any of examples 21-35, wherein the selected service may be a first service and the instructions may be further to cause the computing system to repeat the determine, select, and deploy with respect to the one or more deployed devices for a second service other than the first service.

Example 37 may include the non-transitory computer-readable media of example 36, wherein the first service may be operated on a first set of selected devices of the one or more deployed devices, the second service may be operated on a second set of selected devices of the one or more deployed devices, and the first and second sets of selected devices may be different.

Example 38 may include the non-transitory computer-readable media of any of examples 21-37, wherein determine a service may include present service options to a user and receive a selected service from the user.

Example 39 may include the non-transitory computer-readable media of any of examples 21-38, wherein determine a service may include receive modifications to a service from a user.

Example 40 may include the system of any of examples 21-39, wherein obtain data may include obtain data from agents operating on the one or more deployed devices Example 41 may include a method for facilitating usage of deployed devices. The method may include: obtaining, by a computing system, data for one or more deployed computing devices; determining, by the computing system, capabilities of the one or more computing devices; determining, by the computing system, a service to be performed by selected devices of the one or more deployed devices; selecting, by the computing system, from the one or more deployed computing devices, the selected devices; and deploying, by the computing system, the service to the one or more selected devices for performance of the service.

Example 42 may include the method of example 41, wherein obtaining data may include collecting telemetry information for the one or more deployed devices.

Example 43 may include the method of example 42, wherein the telemetry information may include one or more of: storage space, processor usage, temperature, data throughput, network capabilities, memory usage, and load averages.

Example 44 may include the method of example 43, wherein obtaining data may include collecting service payload information for the one or more deployed devices.

Example 45 may include the method of any of examples 41-44, wherein obtaining data may include collecting service metadata for the one or more deployed devices.

Example 46 may include the method of example 45, wherein the service metadata may include one or more of: identification of currently running tasks, estimated task completion time, capacity for running additional tasks, and sensor types devices are connected to.

Example 47 may include the method of any of examples 41-46, and may further include performing, by the computing system, a service suitability analysis to determine suitability of the one or more deployed devices to perform the service.

Example 48 may include the method of example 47, wherein performing the service suitability analysis may include analyzing one or more of: geographical location of the one or more deployed devices, abilities of the one or more deployed devices to perform characteristics of the service, and historical performance of the one or more deployed devices.

Example 49 may include the method of any of examples 41-48, wherein deploying the service may include generating a service descriptor.

Example 50 may include the method of example 49, wherein the service descriptor may include an identification of the service.

Example 51 may include the method of example 49, wherein the service descriptor may include an entry for each of the selected devices including an executable file for each of the selected devices.

Example 52 may include the method of example 51, wherein deploying the service may include deploying the executable files to the selected devices.

Example 53 may include the method of example 49, wherein the service descriptor may include an entry for each of the selected devices including configuration information for each of the selected devices.

Example 54 may include the method of example 49, wherein the service descriptor may include instructions to direct different devices to perform different activities.

Example 55 may include the method of example 54, wherein the service descriptor may include, for a first device, instructions to perform a different activity than was previously performed by the first device when executing a previous service.

Example 56 may include the method of any of examples 41-55, wherein the selected service is a first service and the method may further include repeating the determining, selecting, and deploying with respect to the one or more deployed devices for a second service other than the first service.

Example 57 may include the method of example 56, wherein the first service may be operated on a first set of selected devices of the one or more deployed devices, the second service may be operated on a second set of selected devices of the one or more deployed devices, and the first and second sets of selected devices may be different.

Example 58 may include the method of any of examples 41-57, wherein determining a service may include presenting service options to a user and receiving a selected service from the user.

Example 59 may include the method of any of examples 41-58, wherein determining a service may include receiving modifications to a service from a user.

Example 60 may include the method of any of examples 41-59, wherein obtaining data may include obtaining data from agents operating on the one or more deployed devices.

Example 61 may include a system for facilitating usage of deployed devices. The system may include: means for obtaining data for one or more deployed devices; means for determining capabilities of the one or more devices; means for determining a service to be performed by selected devices of the one or more deployed devices; means for selecting from the one or more deployed devices, the selected devices; and means for deploying the service to the one or more selected devices for performance of the service.

Example 62 may include the system of example 61, wherein means for obtaining data may include means for collecting telemetry information for the one or more deployed devices.

Example 63 may include the system of example 62, wherein the telemetry information may include one or more of: storage space, processor usage, temperature, data throughput, network capabilities, memory usage, and load averages.

Example 64 may include the system of example 63, wherein means for obtaining data may include means for collecting service payload information for the one or more deployed devices.

Example 65 may include the system of any of examples 61-64, wherein means for obtaining data may include means for collecting service metadata for the one or more deployed devices.

Example 66 may include the system of example 65, wherein the service metadata may include one or more of: identification of currently running tasks, estimated task completion time, capacity for running additional tasks, and sensor types devices are connected to.

Example 67 may include the system of any of examples 61-66, and may further include means for performing a service suitability analysis to determine suitability of the one or more deployed devices to perform the service.

Example 68 may include the system of example 67, wherein means for performing the service suitability analysis may include means for analyzing one or more of: geographical location of the one or more deployed devices, abilities of the one or more deployed devices to perform characteristics of the service, and historical performance of the one or more deployed devices.

Example 69 may include the system of any of examples 61-68, wherein means for deploying the service may include means for generating a service descriptor.

Example 70 may include the system of example 69, wherein the service descriptor may include an identification of the service.

Example 71 may include the system of example 69, wherein the service descriptor may include an entry for each of the selected devices including an executable file for each of the selected devices.

Example 72 may include the system of example 71, wherein means for deploying the service may include means for deploying the executable files to the selected devices.

Example 73 may include the system of example 69, wherein the service descriptor may include an entry for each of the selected devices including configuration information for each of the selected devices.

Example 74 may include the system of example 69, wherein the service descriptor may include instructions to direct different devices to perform different activities.

Example 75 may include the system of example 74, wherein the service descriptor may include, for a first device, instructions to perform a different activity than was previously performed by the first device when executing a previous service.

Example 76 may include the system of any of examples 61-75, wherein the selected service may be a first service and the apparatus may further include means for repeating determining, selecting, and deploying with respect to the one or more deployed devices for a second service other than the first service.

Example 77 may include the system of example 76, wherein the first service may be operated on a first set of selected devices of the one or more deployed devices, the second service may be operated on a second set of selected devices of the one or more deployed devices, and the first and second sets of selected devices may be different Example 78 may include the system of any of examples 61-77, wherein means for determining a service may include means for presenting service options to a user and means for receiving a selected service from the user.

Example 79 may include the system of any of examples 61-78, wherein means for determining a service may include means for receiving modifications to a service from a user.

Example 80 may include the system of any of examples 61-79, wherein means for obtaining data may include means for obtaining data from agents operating on the one or more deployed devices.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A system for facilitating usage of deployed devices, the system comprising:
   one or more computing processors and at least one memory;

the one or more computing processors arranged to operate service orchestration logic to: obtain data for one or more deployed devices, and determine capabilities of the one or more devices based on the obtained data; and the one or more computing processors arranged to operate service management logic to:
    determine a user-customized service to be performed by identified devices of the one or more deployed devices, the user-customized service including one or more customized parameters for operation of a predefined service, the one or more customized parameters including one or more of user-defined timing parameters, user-defined data measurement instructions, user-defined sensor types, or user-defined computational instructions,
    perform a service suitability analysis to determine, for the identified devices, suitability to perform the user-customized service based on the obtained data of the identified devices, the determined capabilities of the identified devices, and performance metrics of the identified devices, wherein the suitability analysis includes a determination of a spatial relationship between one or more points in a user-selected area in which to deploy the user-customized service and deployed devices of the one or more deployed devices in the user-selected area,
    select some or all of the identified devices to perform the user-customized service based on the suitability analysis, and
    deploy the user-customized service to the selected devices for performance of the user-customized service;

wherein the service orchestration logic is arranged to schedule deployment of the user-customized service to the selected devices.

2. The system of claim 1, wherein the obtained data includes telemetry data from each deployed device of the one or more deployed devices, wherein the telemetry data includes one or more of: available storage space, total storage space, processor utilization, processor speed, die temperature, data throughput, network capabilities, memory usage, or load averages.

3. The system of claim 1, wherein the obtained data further comprises service payload data for the one or more deployed devices, the service payload data comprising one or more of the performance metrics or sensor measurements provided by the one or more deployed devices, the performance metrics including one or more of power metrics of the deployed devices, device reliability metrics of the deployed devices, and device connectivity metrics of the deployed devices.

4. The system of claim 1, wherein obtained data further comprises service metadata for the one or more deployed devices, wherein the service metadata includes one or more of: identification of currently running tasks, estimated task completion time, capacity for running additional tasks, and sensor types connected to the one or more deployed devices.

5. The system of claim 1, wherein the service management logic comprises model management logic arranged to determine suitability through analysis of one or more of: geographical location of the one or more deployed devices and abilities of the one or more deployed devices to perform characteristics of the service.

6. The system of claim 5, wherein the model management logic is further arranged to determine suitability through analysis of historical performance of the one or more deployed devices.

7. The system of claim 1, wherein the service management logic is arranged to deploy the service through generation of a service descriptor, and wherein the service descriptor includes an identification of the service.

8. The system of claim 7, wherein the service descriptor includes an entry for each of the selected devices including an executable file for each of the selected devices.

9. The system of claim 8, wherein the service management logic comprises deployment management logic arranged to deploy the service through deployment of the executable files to the selected devices.

10. The system of claim 7, wherein the service descriptor includes an entry for each of the selected devices including configuration information for each of the selected devices.

11. The system of claim 7, wherein the service descriptor includes instructions to direct different devices to perform different activities.

12. The system of claim 11, wherein the service descriptor includes, for a first device, instructions to perform a different activity than was previously performed by the first device when executing a previous service.

13. The system of claim 1, wherein the user-customized service is a first service and the service management logic is arranged to repeat the determine, select, and deploy with respect to the one or more deployed devices for a second service other than the first service, wherein the first service is operated on a first set of selected devices of the one or more deployed devices, the second service is operated on a second set of selected devices of the one or more deployed devices, and the first and second sets of selected devices are different.

14. The system of claim 1, wherein the service management logic is arranged to determine a service through: presentation of service options to a user; and receipt of a selected service from the user.

15. The system of claim 1, wherein the service management logic is arranged to determine a service through receipt of modifications to an existing service from a user.

16. The system of claim 1, wherein the service orchestration logic is arranged to obtain data from agents operating on the one or more deployed devices.

17. One or more non-transitory computer-readable media comprising instructions written thereon, wherein execution of the instructions by a computing system is to cause the computing system to:
    obtain data for one or more deployed computing devices;
    determine capabilities of the one or more computing devices based on the obtained data;
    determine a user-customized service to be performed by identified devices of the one or more deployed computing devices, the user-customized service including one or more customized parameters for operation of a predefined service, the one or more customized parameters including one or more of user-defined timing parameters, user-defined data measurement instructions, user-defined sensor types, or user-defined computational instructions;
    perform a service suitability analysis to determine, for the identified devices of the one or more deployed computing devices, suitability to perform the user-customized service based on the obtained data of the identified devices, the determined capabilities of the identified devices, and performance metrics of the identified devices, wherein the suitability analysis including a determination of a spatial relationship between one or more points in a user-selected area in which to deploy the user-customized service and deployed devices of the one or more deployed devices in the user-selected area;
select some or all of the identified devices to perform the user-customized service based on the suitability analysis;
schedule deployment of the user-customized service to the selected devices; and
deploy, based on the scheduled deployment, the user-customized service to the selected devices for performance of the user-customized service.

18. The non-transitory computer-readable media of claim 17, wherein the obtained data includes telemetry data received from each deployed computing device of the one or more deployed computing devices, the telemetry data from the one or more deployed computing devices includes one or more of available storage space, total storage space, memory usage, processor utilization, processor speed, die temperature, network capabilities, data throughput levels, or load averages.

19. The non-transitory computer-readable media of claim 17, wherein the obtained data includes service metadata for the one or more deployed computing devices and service payload data for the one or more deployed computing devices, wherein the service metadata comprises one or more of identification of currently running tasks, estimated task completion time, capacity for running additional tasks, and sensor types connected to the one or more deployed computing devices; and the service payload data comprises one or more of the performance metrics or sensor measurements provided by the one or more deployed computing devices, the performance metrics including one or more of power metrics of the deployed computing devices, device reliability metrics of the deployed computing devices, and device connectivity metrics of the deployed computing devices.

20. The non-transitory computer-readable media of claim 19, wherein execution of the instructions is to cause the computing system to:
perform a service suitability analysis based on the obtained data to determine suitability of the one or more deployed computing devices to perform the user-customized service; and
reconfigure one or more capabilities of one or more of the selected devices for deployment of the user-customized service.

21. The non-transitory computer-readable media of claim 17, wherein, to determine a service, execution of the instructions is to cause the computing system to: present service options to a user; and receive a selected service from the user.

22. A method for facilitating usage of deployed devices, the method comprising:
obtaining, by a computing system, data for one or more deployed computing devices;
determining, by the computing system, capabilities of the one or more computing devices based on the obtained data;
determining, by the computing system, a user-customized service to be performed by identified devices of the one or more deployed computing devices, the user-customized service including one or more customized parameters for operation of a predefined service, the one or more customized parameters including one or more of user-defined timing parameters, user-defined data measurement instructions, user-defined sensor types, or user-defined computational instructions;
performing a service suitability analysis to determine, for the identified devices of the one or more deployed computing devices, a suitability to perform the user-customized service based on the obtained data of the identified devices, the determined capabilities of the identified devices, and performance metrics of the identified devices, wherein performing the suitability analysis comprises determining a spatial relationship between one or more points in a user-selected area in which to deploy the user-customized service and deployed devices of the one or more deployed devices in the user-selected area;
selecting, by the computing system, some or all of the identified devices to perform the user-customized service based on the suitability analysis; and
deploying, by the computing system, the user-customized service to the selected devices for performance of the user-customized service.

23. The method of claim 22, wherein the obtained data includes:
telemetry data received from each deployed computing device of the one or more deployed computing devices, wherein the telemetry data includes one or more of available storage space, memory usage, processor utilization, die temperature, data throughput levels, or load averages,
service metadata for the one or more deployed computing devices and service payload data for the one or more deployed computing devices,
wherein the service metadata comprises one or more of identification of currently running tasks, estimated task completion time, capacity for running additional tasks, and sensor types connected to the one or more deployed computing devices,
wherein the service payload data comprises one or more of the performance metrics or sensor measurements provided by the one or more deployed computing devices, and
wherein the performance metrics include one or more of power metrics of the deployed computing devices, device reliability metrics of the deployed computing devices, and device connectivity metrics of the deployed computing devices.

24. The method of claim 22, further comprising:
performing, by the computing system, a service suitability analysis to determine suitability of the one or more deployed computing devices to perform the user-customized service; and
reconfiguring one or more capabilities of one or more of the selected devices for deploying the user-customized service.

25. The method of claim 22, wherein determining the user-customized service comprises: presenting service options to a user; and receiving a selected service from the user.

26. A service orchestration and management system (SOMS) comprising:
a message management subsystem comprising one or more hardware processors arranged to communicate with a plurality of deployed Internet of Things (IoT) devices, wherein the communication with the plurality of deployed IoT devices includes collection of device information from each deployed IoT device of the plurality of deployed IoT devices;
a user management subsystem comprising one or more hardware processors arranged to provide service information to one or more users, and obtain service objective data from the one or more users, wherein the service objective data includes customizations of one or more predefined services indicated by the provided service information, the customizations including one or more customized parameters for operation of the predefined service, the one or more customized parameters including one or more of user-defined timing parameters, user-defined data measurement instructions, user-defined sensor types, or user-defined computational instructions;

a service management subsystem comprising one or more hardware processors arranged to:
  determine one or more deployable services based on the service objective data,
  perform a service suitability analysis based on the device information to determine, for one or more deployed IoT devices of the plurality of deployed IoT devices, suitability to perform the one or more deployable services, wherein the suitability analysis including a determination of a spatial relationship between one or more points in a user-selected area in which to deploy one or more deployable services and deployed devices of the one or more deployed devices in the user-selected area, and
  select suitable IoT devices of the plurality of deployed IoT devices based on the service suitability analysis; and a service orchestration subsystem comprising one or more hardware processors arranged to schedule and deploy the one or more deployable services to the selected IoT devices.

27. The SOMS of claim 26, wherein the user management subsystem is arranged to:
  provide program code for rendering a graphical user interface to display the service information, wherein the service information is to indicate one or more services that have been previously generated or modified by other users of the SOMS, and wherein the service objective data is based on one or more user interactions with the graphical user interface.

28. The SOMS of claim 27, wherein the collected device information includes device telemetry information of the deployed IoT devices and service metadata of the deployed IoT devices, wherein:
  the device telemetry information comprises one or more of available storage space, total disk space, memory usage, processor utilization, processor speed, die temperature, data throughput levels, network interfaces, or load averages, and
  the service metadata comprises sensor information of the deployed IoT devices and task information of the deployed IoT devices, the task information includes identification of currently running tasks, estimated task completion time, and capacity for running additional tasks, and the sensor information includes types of sensors connected to each of the deployed IoT devices.

29. The SOMS of claim 26, wherein the collected device information includes service payload data, the service payload data comprises one or more of performance metrics or sensor measurements provided by the one or more deployed devices, the performance metrics including one or more of power metrics of the deployed devices, device reliability metrics of the deployed devices, and device connectivity metrics of the deployed devices, and the service suitability analysis comprises analysis of device power metrics, device reliability metrics, and device connectivity metrics of the deployed IoT devices.

30. The SOMS of claim 26, wherein the service management subsystem is arranged to: generate service configuration profiles for the suitable IoT devices, wherein the service configuration profiles comprise one or more service configuration items based on the service objective data and the device information.

* * * * *